(12) United States Patent
Yang et al.

(10) Patent No.: US 12,375,134 B2
(45) Date of Patent: Jul. 29, 2025

(54) CHANNEL STATE INFORMATION (CSI) OMMISSION IN ADVANCED MULTIPLE INPUT MULTIPLE OUTPUT (MIMO) CSI FEEDBACK

(71) Applicant: Apple Inc., Cupertino, CA (US)

(72) Inventors: Weidong Yang, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Seyed Ali Akbar Fakoorian, San Diego, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/778,127

(22) PCT Filed: Sep. 24, 2021

(86) PCT No.: PCT/CN2021/120491
§ 371 (c)(1),
(2) Date: Mar. 30, 2023

(87) PCT Pub. No.: WO2023/044823
PCT Pub. Date: Mar. 30, 2023

(65) Prior Publication Data
US 2024/0178889 A1    May 30, 2024

(51) Int. Cl.
*H04B 7/0417* (2017.01)

(52) U.S. Cl.
CPC ................ *H04B 7/0417* (2013.01)

(58) Field of Classification Search
CPC ...... H04B 7/06; H04B 7/0417; H04B 7/0456; H04B 7/0478; H04B 7/0626;
(Continued)

(56) References Cited

U.S. PATENT DOCUMENTS

| | | | |
|---|---|---|---|
| 2021/0297134 A1* | 9/2021 | Rahman | H04B 7/0632 |
| 2022/0239360 A1* | 7/2022 | Fax?r | H04B 7/0658 |
| 2022/0385344 A1* | 12/2022 | Großmann | H04B 7/0478 |

FOREIGN PATENT DOCUMENTS

| | | |
|---|---|---|
| WO | 2020091542 A1 | 5/2020 |
| WO | 2020091544 A1 | 5/2020 |

(Continued)

OTHER PUBLICATIONS

3rd Generation Partnership Project; Technical Specification Group Radio Access Network; NR; Physical layer procedures for data; (Release 16); 3GPP TS 38.214 V16.6.0 (Jun. 2021).
(Continued)

*Primary Examiner* — Shawkat M Ali
(74) *Attorney, Agent, or Firm* — Eschweiler & Potashnik, LLC; Ningjiao Zhang

(57) ABSTRACT

Techniques, described herein, include solutions for managing uplink control information (UCI) transmission for a channel state information (CSI) report resulting from measurements of CSI measurement resources. In response to the CSI report exceeding allocated uplink resources of a UCI transmission, a compressed CSI report can be generated by performing an uplink control information (UCI) omission to omit parameters of the CSI report based on components comprising frequency domain (FD) components and time domain (TD) components of the MIMO codebook configuration. The UCI transmission can be generated with the compressed CSI report.

21 Claims, 22 Drawing Sheets

(58) Field of Classification Search
CPC ........... H04B 7/0658; H04L 1/06; H04L 5/00; H04W 24/08; H04W 24/10; H04W 72/04
USPC .................... 375/219, 260, 267, 295, 316
See application file for complete search history.

(56) References Cited

FOREIGN PATENT DOCUMENTS

| WO | 2020150860 A1 | 7/2020 |
|----|---------------|--------|
| WO | 2020/225642 A1 | 11/2020 |
| WO | 2021/035396 A1 | 3/2021 |
| WO | 2021148629 A1 | 7/2021 |

OTHER PUBLICATIONS

3rd Generation Partnership Project; Technical Specification Group Radio Access Network; NR; Radio Resource Control (RRC) protocol specification; (Release 16); 3GPP TS 38.331 V16.5.0 (Jun. 2021).
PCT Search Report dated Jun. 19, 2022 in connection with PCT Application No. PCT/CN2021/120491.
PCT Written Opinion dated Jun. 20, 2022 in connection with PCT Application No. PCT/CN2021/120491.
European Extended Search Report dated Mar. 3, 2025 in connection with Application No. EP21957946.3.
ERICSSON: "On CSI enhancements for Mu-Mimo"; 3GPP Tsg Ran WG1 Meeting RAN1#98; R1-1909379, Aug. 26, 2019.

* cited by examiner

CHANNEL STATE INFORMATION (CSI) OMMISSION IN ADVANCED MULTIPLE INPUT MULTIPLE OUTPUT (MIMO) CSI FEEDBACK

This application is a National Phase entry application of International Patent Application No. PCT/CN2021/120491 filed Sep. 24, 2021, entitled "CHANNEL STATE INFORMATION (CSI) OMMISSION IN ADVANCED MULTIPLE INPUT MULTIPLE OUTPUT (MIMO) CSI FEEDBACK", the contents of which are herein incorporated by reference in their entirety.

FIELD

This disclosure relates to wireless communication networks including techniques for channel state information (CSI) omission in advanced multiple input multiple output (MIMO) CSI feedback.

BACKGROUND

Wireless communication networks may include user equipment (UEs) (e.g., smartphones, tablet computers, etc.) capable of communicating with base stations and other network nodes. To facilitate communication between base stations and user equipments (UEs) in Third Generation Partnership Project (3GPP) networks precoders are implemented by the base stations for signals transmitted by the base stations. The base stations can determine the values for the precoders based on channel state information (CSI) signals fed back from the UEs. In particular, the UE performs measurements on signals received from the base stations and feeds back information regarding the measurements to be utilized for determining values for the precoders.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

DETAILED DESCRIPTION

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

In some iterations of the third generation partnership project (3GPP) for radio access network (RAN), such as Release 18 for example, codebook design exploiting time domain correlation and predictive precoder for high Doppler cases can be included. Disclosed herein in some embodiments or aspects are designs exploiting parsimonious representation of the Doppler domain spread. With that, low feedback overhead can be achieved and downlink throughput with high Doppler cases can be improved. With the disclosed CSI feedback, CSI for multiple PDSCH occasions, which can be spread into the time domain, can be derived or obtained at the gNB. For each PDSCH occasion, a precoding matrix indicator (PMI) and channel quality indicator (Cal), including wideband CQI and subband CQIs, can be derived or obtained at the base station. Further, by using an oversampling factor (Rd), multiple precoders for different orthogonal frequency division multiplexing (OFDM) symbols in the same physical downlink shared channel (PDSCH) can be derived by a base station, such as a next generation NodeB (gNB). According to various aspects, omission is conceived with one or more omission rules for communication of CSI measurement reports in an uplink control information (UCI) transmission. Because a linear combination codebook can be associated with a large payload, as with codebook designs herein, an omission of CSI can be configured when the channel resources exceed allocated resources for the UCI transmission.

Figure 1:
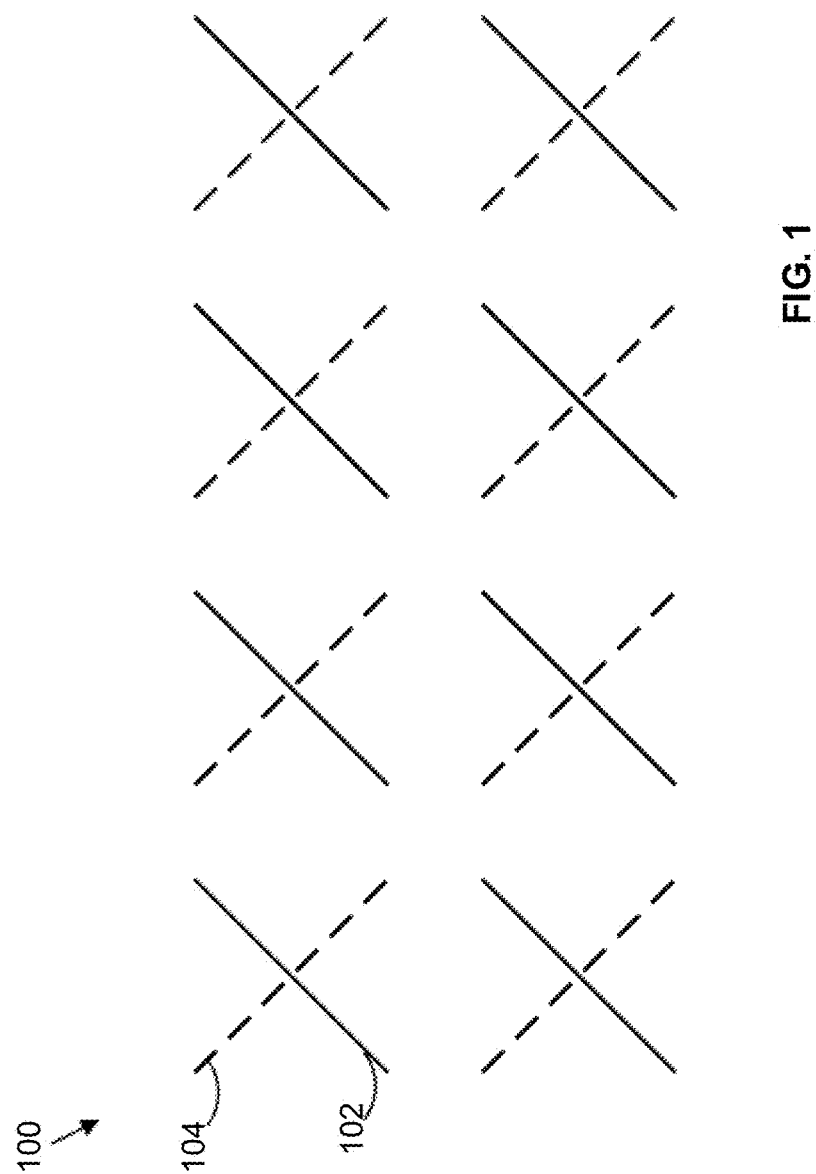
FIG. 1 illustrates an example antenna structure for a base station in accordance with some embodiments (aspects).

FIG. 1 illustrates an example antenna structure 100 for a base station in accordance with some embodiments. Regular antennas may be placed on a base station antenna array. In particular, the antenna structure 100 may be implemented within a base station (e.g., next generation NodeB (gNB) 2120 as illustrated in (FIG. 21)) as part of a base station antenna array.

The antenna structure 100 may include one or more antennas. The antennas may transmit signals at different antenna polarizations. For example, the illustrated antenna structure 100 may transmit signals with a first polarization (which may be referred to as "polarization 0") and a second polarization (which may be referred to as "polarization 1"). In particular, the antenna structure 100 shows a first antenna 102 with a first polarization (indicated by the solid line) and a second antenna 104 with a second polarization (indicated by the dotted line). The antenna structure 100 may include a one or more antennas with first polarization (indicated by the solid lines) and one or more antennas with second polarization (indicated by the dotted lines). In some embodiments, the second polarization may be orthogonal to the first polarization. While the first polarization and the second polarization are described as being generated by separate antennas, it should be understood that a single antenna may implement one or more polarizations (e.g., two polarizations) in other aspects or polarizations may be implemented by a single antenna or different antennas.

One or more signals may be transmitted by the antennas of the antenna structure 100. Signals transmitted by antennas with the first polarization may be transmitted in the first polarization and signals transmitted by the antennas with the second polarization may be transmitted in the second polarization. One or more precoders may determine the phases and amplitudes for signals transmitted by the antennas. The precoders may be utilized for determining an amplitude of the signals transmitted by the antennas and/or which antennas are to transmit the signals. In some embodiments, the precoders may further be utilized to determine directions in which the signals are to be transmitted, such as in beamforming implementations. The precoders may be defined based on CSI feedback received from UEs. For example, a base station may receive CSI feedback from a UE (such as the UE 2110 of FIG. 21) and may determine precoder values for precoders corresponding to the UE based on the CSI feedback, such as through signal to leakage ratio. The base station can then utilize the determined precoder values for the precoders for precoding signals to be transmitted to the UE.

A base station (such as the gNB 2122 of FIG. 21) can determine precoder values for precoders for a UE based on equations for defining a codebook. For example, the base station could determine the precoder values for a spatial layer based on $$\begin{bmatrix} \sum_{p=0,b=1}^{B_0} A(\theta_{b,p}, \phi_{b,p}) C_{b,p} \delta(t - \tau_{b,p}) \\ \sum_{p=1,b=1}^{B_1} A(\theta_{b,p}, \phi_{b,p}) C_{b,p} \delta(t - \tau_{b,p}) \end{bmatrix},$$

where p is the polarization index (e.g., p=0 for polarization at +45° (which may be a first polarization) and p=1 for polarization at −45° (which may be a second polarization)), there are $B_0$ significant beams for transmission (Tx) antennas at polarization index 0, and $B_1$ significant beam for Tx antennas at polarization index 1. For polarization index p, b is the ray index for a ray (ray (p, b)) with departure angles $(\theta_{b,p}, \phi_{b,p})$, $A(\theta_{b,p}, \phi_{b,p})$ is the array response for $(\theta_{b,p}, \phi_{b,p})$, $\tau_{b,p}$ is the relative delay, and ab is the path gain including amplitude and phase for ray b. Assume regular antenna element arrangement, then $(\theta_{b,p}, \phi_{b,p})$ can be mapped to $(i_1, i_2, p_1, p_2)$, where $p_1$, $0 \leq p_1 \leq O_1-1$ and $p_2$, $0 \leq p_2 \leq O_2-1$ are oversampling factors for the vertical domain and the horizontal domain respectively, and $(i_1, i_2)$ are the spatial beam indices. $C_{b,p}$ is a complex coefficient connecting a spatial beam and a delay $\tau_{b,p}$ is a relative delay of ray (p, b) according to the reference receiver timing. The base station may apply the determined precoder values via precoders to signals transmitted by the base station to the UE.

The base station may determine the precoders for a layer for a UE based on CSI received from the UE. For example, precoders for a layer may be given by size-P×$N_3$ matrix $W = W_1 \tilde{W}_2 W_f^H$, where $W_1$ is a spatial beam selection, $\tilde{W}_2$ is a bitmap design and quantizer design, and $W_f^H$ is a FD component selection. P may be equal to $2N_1N_2$, which may be equal to a number of spatial domain (SD) dimensions, $N_1$ is the number of antenna ports in one dimension (e.g., for the vertical domain, and $N_1=2$ for FIG. 2) and $N_2$ is the number of antenna ports in another dimension (e.g., for the horizon domain, and $N_2=4$). $N_3$ may be equal to a number of FD dimensions. Precoder normalization may be applied, where the precoder normalization may be defined by the precoding matrix for given rank and unit of $N_3$ is normalized to norm 1/sqrt(rank), where sqrt(rank) is the square root of a rank indicator.

SD selection/compression/quantization may be applied. L spatial domain basis vectors common for both polarizations (mapped to the two polarizations, so 2L spatial beams for both polarizations in total) may be selected. Compression/quantization in spatial domain using $$W_1 = \begin{bmatrix} v_0 v_1 \ldots v_{L-1} & 0 \\ 0 & v_0 v_1 \ldots v_{L-1} \end{bmatrix}$$

may be applied to select spatial beams associated with significant power, where $\{v_i\}_{i=0}^{L-1}$ are $N_1N_2 \times 1$ orthogonal DFT vectors (similar as Rel. 15 Type II).

FD selection/compression/quantization may be applied. Compression via $W_f = [f_{k_0} f_{k_1} \ldots f_{k_{M-1}}]$, where $\{f_{k_m}\}_{m=0}^{M-1}$ are M size-$N_3 \times 1$ orthogonal DFT vectors to select FD components with significant power for a spatial layer. Number of FD-components M may be configurable. L and M may be configured by the gNB. In some embodiments, the FD compression unit may be determined by the number of CQI subbands and {PMI subband size=CQI subband size} as the default, and may be determined by {PMI subband size=CQI subband size/R} as a secondary choice. The value of R may be fixed to two. The FD compression unit parameter R may be higher-layered configured. The number of FD compression units, M, may be determined by $$M = \left\lceil p \times \frac{N_3}{R} \right\rceil$$

where $$p \in \left\{ \frac{1}{4}, \frac{1}{2} \right\}.$$

The value of M may be higher-layer configured, such as via R and p. The values for $N_3$ for $R \in \{1,2\}$ and $N_{SB}$ (the number of CQI subbands) may be determined by $N_3 = N_{SB} \times R$. $R \in \{1, 2\}$ may be higher-layer configured.

Figure 2:
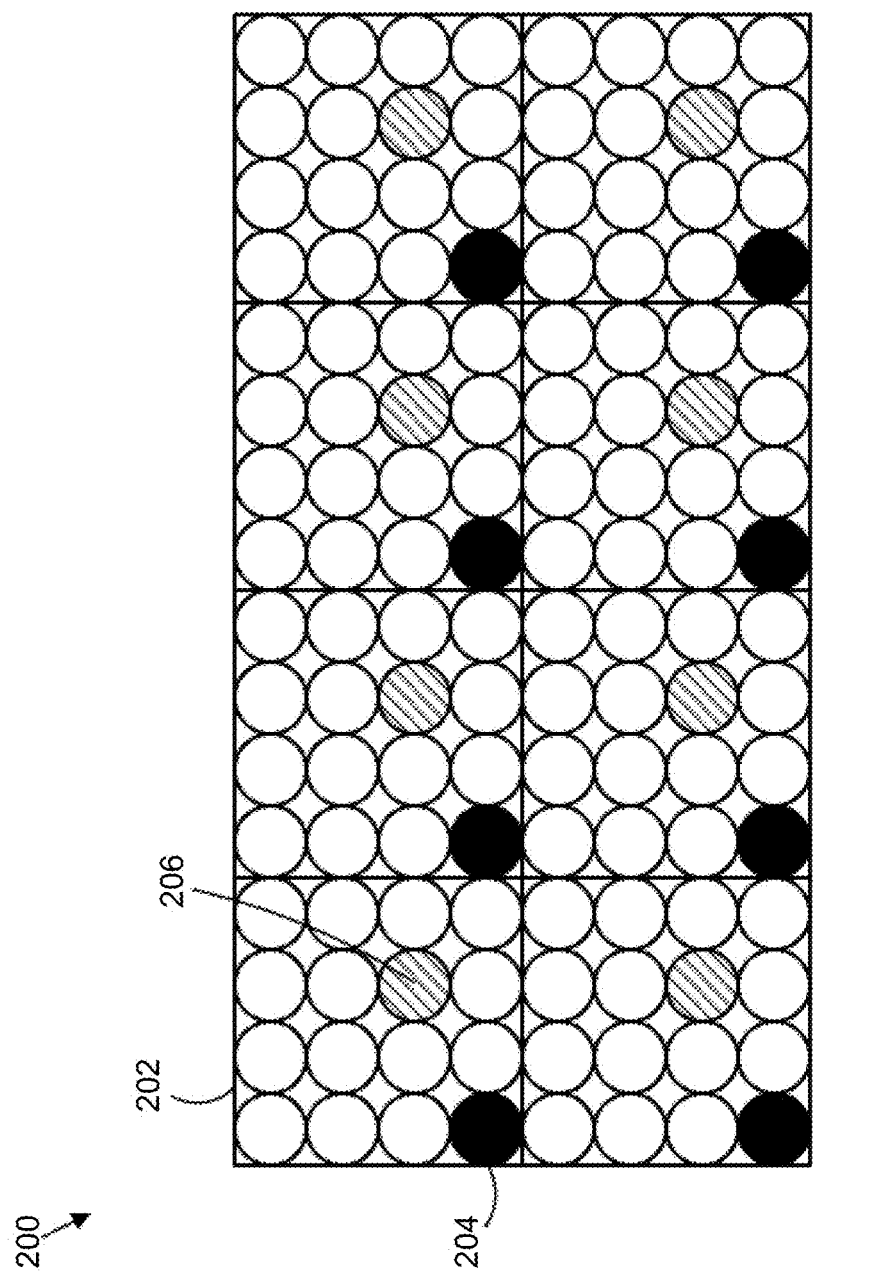
FIG. 2 illustrates example spatial beam selection representation in accordance with some embodiments.

FIG. 2 illustrates example spatial beam selection representation 200 in accordance with some embodiments. (i1,i2) may be used to choose the main direction of a spatial beam. (q1,q2) may be used to fine-tune the direction of the spatial beam. To ensure orthogonal bases, the same (q1,q2) may be used for all selected spatial beams.

The spatial beam selection representation 200 represents spatial beams that may be transmitted by one or more antennas. In particular, the spatial beam selection representation 200 may indicate spatial beams that may transmitted by the antennas of the antenna structure 100 (FIG. 1) in some aspects. The spatial beams (represented by circles in the illustrated spatial beam selection representation 200) may be grouped (as indicated by the squares around the groups of spatial beams in the illustrated spatial beam selection representation 200) into groups of 16 spatial beams, where each of the groups may correspond to an antenna or paired antennas with two different polarizations. The (i1, i2) may indicate a selected group and (q1, q2) may indicate the particular spatial beam within the selected group.

The spatial beam selection representation 200 may include two groups in a first direction and four groups in a second direction, resulting in a two by four arrangement of groups. Each group may have four spatial beams in the first direction and four spatial beams in the second direction. For example, the spatial beam selection representation 200 may include a first group 202. The first group 202 may include 16 spatial beams in a four by four arrangement. The first group 202 may include an orthogonal discrete Fourier transform (DFT) beam 204, as indicated by the filled in circle in the spatial beam selection representation 200. The first group 202 may include a rotated DFT beam 206, as indicated by the circle with diagonal lines in the spatial beam selection representation 200. The rotated DFT beam 206 may have rotation factors of $$q_1 = \frac{2}{4} \text{ and } q_2 = \frac{1}{4}.$$

In particular, the rotated DFT beam 206 may be rotated from the orthogonal DFT beam 204 by one spatial beam in the first direction and two spatial beams in the second direction. The unfilled circles of the first group 202 may comprise oversampled DFT beams. Each of the groups may have the same beam arrangement as the first group 202. In particular, the arrangement of the orthogonal DFT beams, the rotated DFT beams, and the oversampled DFT beams may be in the same positions relative to the groups as the orthogonal DFT beam 204, the rotated DFT beam 206, and the oversampled DFT beams within the first group 202 are relative to the first group. The positions of the beams being in the same relative positions in each of the groups may ensure orthogonal bases. It may be possible to select different spatial beams for different antenna polarizations.

Figure 3:
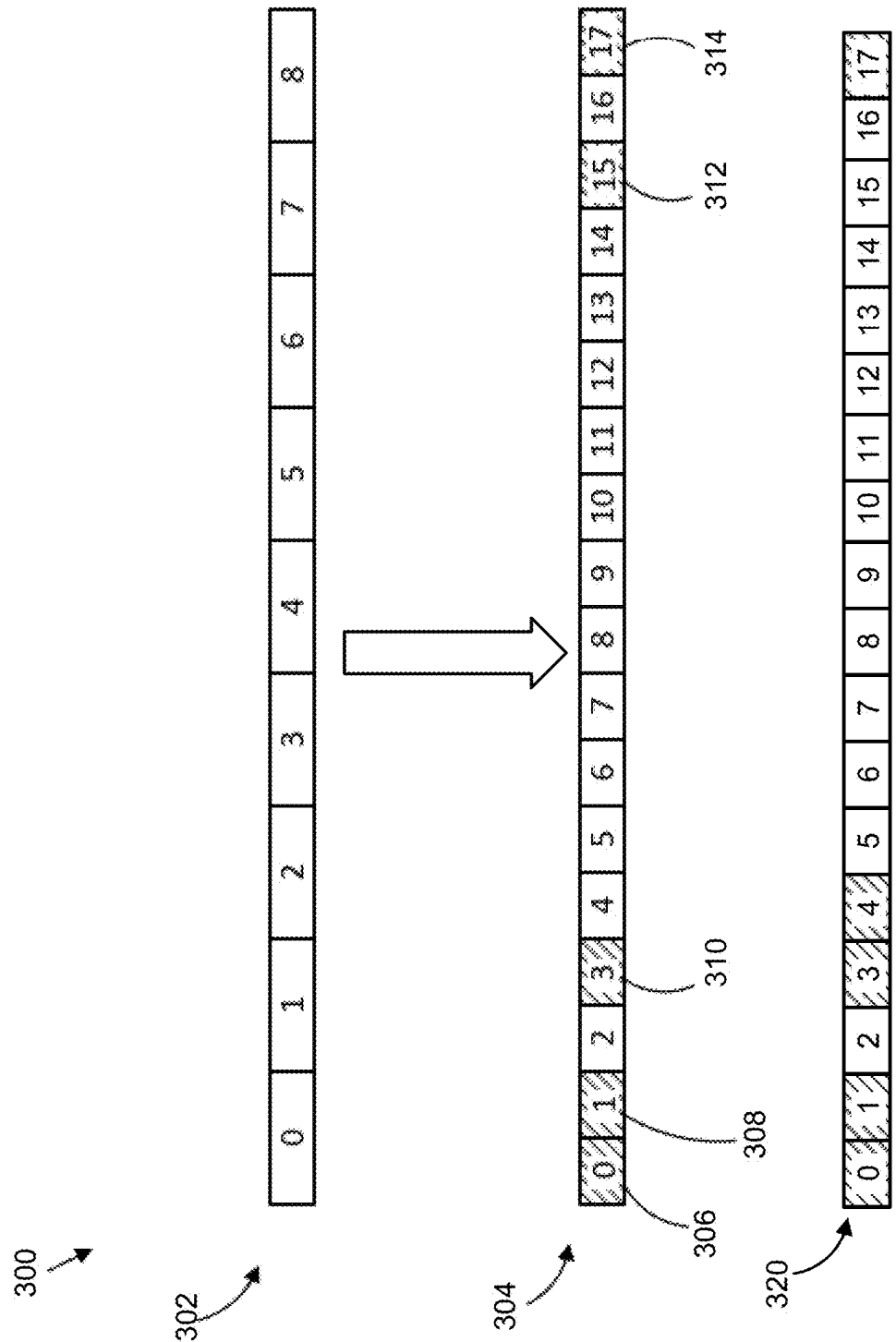
FIG. 3 illustrates an example frequency domain (FD) component selection arrangement in accordance with some embodiments herein.

FD component selection may be implemented by aspects herein. FIG. 3 illustrates an example FD component selection arrangement 300 in accordance with some aspects herein. FD components are the counterpart of delay taps. It is understood from wireless channel propagation, a power delay profile can have a large initial tap (for non-line-of-sight (NLOS), in which the strongest tap may not be the earliest one).

The FD component selection arrangement 300 may include a number of configured CQI subbands 302, which may be represented by the symbol $N_{SB}$. For example, the FD component selection arrangement 300 can include nine configured CQI subbands in the illustrated example. The configured CQI subbands, or some portion thereof, can be available to a UE (such as the UE 2110 of FIG. 21) for transmission of CSI. For example, the UE can transmit CQI on one or more of the CQI subbands.

The configured CQI subbands 302 can be configured with a number of precoders per CQI subband, which can be represented by the symbol R. A number of precoder subbands can be determined based on the number of configured CQI subbands 302 and the number of precoders per CQI subband. For example, $N_3 = R \times N_{SB}$, where $N_3$ is the number of precoder subbands. The number of precoder subbands can define the number of taps in the time domain or the number of FD components. For example, the number of taps in the time domain or the number of FD components can be equal to the number of precoder subbands. The FD component selection arrangement 300 can include precoder subbands 304. The number of precoder subbands 304 can be defined based on the configured CQI subbands 302 and the number of precoders per CQI subband. For example, the precoder subbands 304 include 18 precoder subbands in the illustrated example based on the number of configured CQI subbands 302 being nine configured CQI subbands and the number of precoders per CQI subband being two.

The UE can select a number of FD components, M, from the CQI subbands 302. The number of FD components selected by the UE can be determined based on the number of precoders per CQI subband, the number of precoder subbands, and/or the number of configured CQI subbands 302, which can be represented, for example, as:

$$M = \left\lceil p_v \times \frac{N_3}{R} \right\rceil$$

as the number of selected FD components. The UE can be configured with a value $p_v$, where v is a number of spatial layers (RI) for CSI feedback. In some embodiments, v can be equal to 1, 2, 3, or 4. In the illustrated example, $$p_v \in \left\{ \frac{1}{8}, \frac{1}{4}, \frac{1}{2} \right\}.$$

In the illustrated example, the UE can select five FD components. In particular, the UE can select a first FD component 306, a second FD component 308, a third FD component 310, a fourth FD component 312, and a fifth FD component 314 (as illustrated by the FD components being illustrated with diagonal lines) from the precoder subbands 304 for the CSI feedback, as corresponding to 0, 1, 3, 15 and 17, for example, which correspond to FD components or taps with significant power.

In the illustrated embodiment, the number of configured CQI subbands 302 $N_{SB}$ can be equal to nine, number of precoders per CQI subband R can be equal to two, $p_1$ can be equal to ½, the number of precoder subbands $N_3$ can be equal to 18, and the number of selected precoder components M can be equal to 5, for example. The UE can report the selected FD components to a base station (such as the gNB 2122 of FIG. 21). In particular, the UE can transmit one or more signals to the base station that indicate the selected FD components in a UCI feedback or CSI report such as with precoder FD components 1, 2, 3, 15 and 17. Another spatial layer 320 could be different so that the UE may favor the precoder subbands for the CSI feedback, as corresponding to 0, 1, 3, 4 and 17, but there may be no FD component selection under 15, for example. This demonstrates that the FD component selection comprises a time selection and can vary among different spatial layers for the CSI report in a UCI transmission for CSI feedback.

Figure 4:
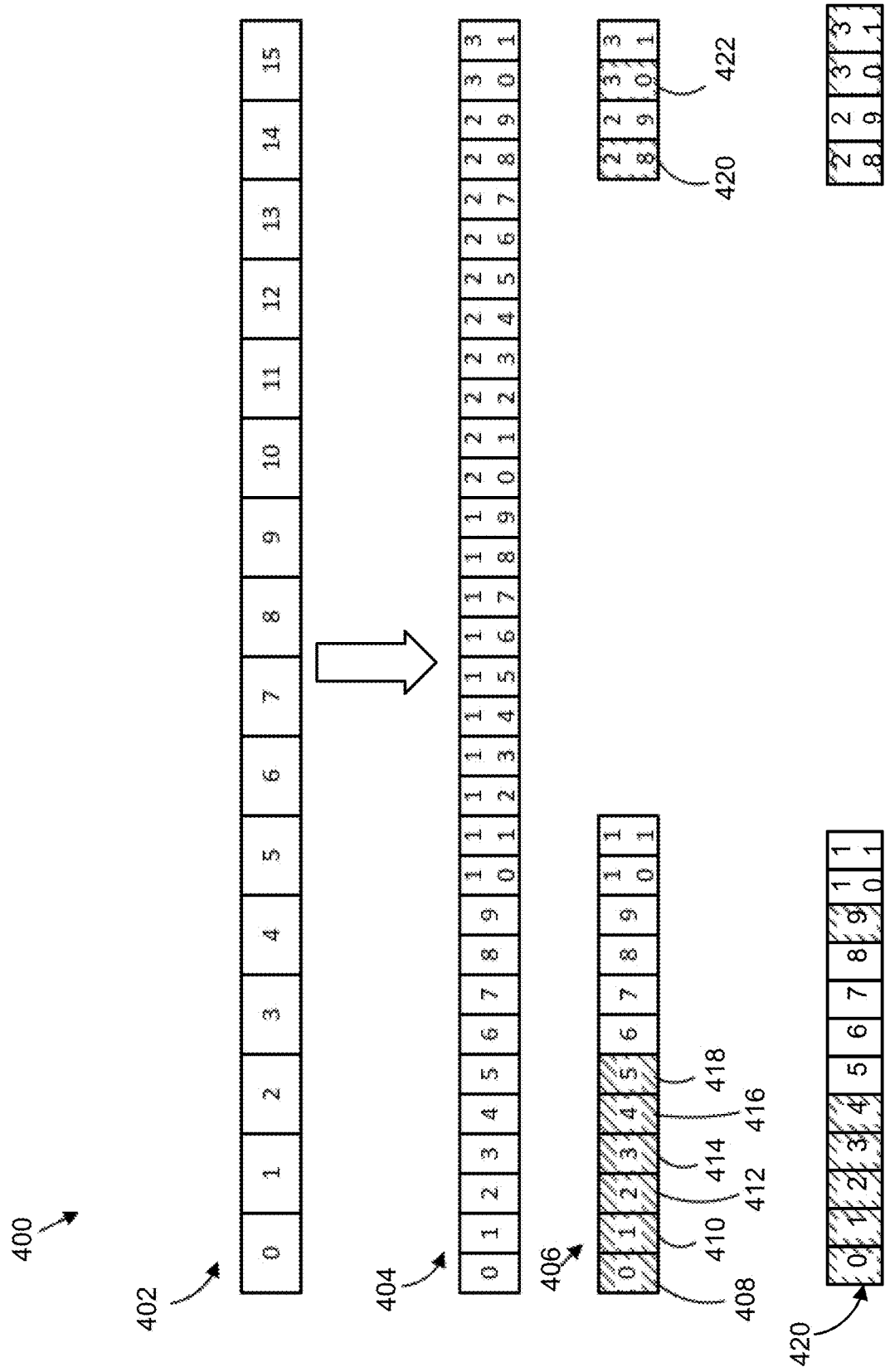
FIG. 4 illustrates another example FD component selection arrangement in accordance with some embodiments.

Due to signaling overhead consideration, a two stage FD component selection can be used when the number of taps is large. FIG. 4 illustrates another example FD component selection arrangement 400 in accordance with some embodiments. The FD component selection arrangement 400 illustrates a two stage FD component selection example.

The FD component selection arrangement 400 can include a number of configured CQI subbands 402, as represented by the symbol $N_{SB}$. For example, the FD component selection arrangement 400 includes 16 configured CQI subbands. The configured CQI subbands, or some portion thereof, can be available to a UE (such as the UE 2110 of FIG. 21) for transmission of CSI. For example, the UE can transmit CQI on one or more of the CQI subbands.

The configured CQI subbands 402 can be configured with a number of precoders per CQI subband, as represented by the symbol R. A number of precoder subbands can be determined based on the number of configured CQI subbands 402 and the number of precoders per CQI subband. For example, $N_3=R\times N_{SB}$, where $N_3$ is the number of precoder subbands. The number of precoder subbands can define the number of taps, or FD components, in the time domain. For example, the number of taps in the time domain or the number of FD components can be equal to the number of precoder subbands. The FD component selection arrangement 400 can include precoder subbands 404. The number of precoder subbands 404 can be defined based on the configured CQI subbands 402 and the number of precoders per CQI subband. For example, the precoder subbands 404 include 32 precoder subbands based on the number of configured CQI subbands 402 being 16 configured CQI subbands and the number of precoders per CQI subband being two.

The UE can further determine an intermediate set 406 from which to select the FD components, where the intermediate set (IntS) 406 can be a subset of the precoder subbands 404. The IntS 406 can be determined based on a number of FD components, M, to be selected by the UE. The number of FD components to be selected can be determined based on the number of precoders per CQI subband, the number of precoder subbands, and/or the number of configured CQI subbands 402. For example, $$M = \left\lceil p_v \times \frac{N_3}{R} \right\rceil.$$

The UE can be configured with a value $p_v$, where v is a number of spatial layers (RI) for CSI feedback. In some embodiments, v can be equal to 1, 2, 3, or 4, for example. In the illustrated embodiment, $$p_v \in \left\{\frac{1}{8}, \frac{1}{4}, \frac{1}{2}\right\}.$$

In the illustrated embodiment, the UE can select eight FD components. The IntS 406 can comprise a set of $N_3'$ FD bases, where $N_3'=2\times M$. The IntS 406 can be defined by $\mod(M_{initial}+n, N_3)$, where n=0, 1, ..., $N_3'-1$. $M_{initial}$ can be selected by the UE and can be reported to a base station (such as the gNB 2122 of FIG. 21) in uplink control information (UCI) part 2. $M_{initial}$ can be selected from a set, where the set is $M_{initial} \in \{-(N_3'-1), -(N_3'-2), \ldots, -1, 0\}$.

The FD component selection arrangement 400 shows the IntS 406 from the precoder subbands 404. In the illustrated embodiment, $M_{initial}$ is −4 at FD component 28. Accordingly, the IntS 406 can extend from precoder subband index 28 to precoder subband index 11 from the right side to the left side of the illustration. The UE can select from the eight FD components from the IntS 406, (e.g., 28, 30, 0, 1, 2, 3, 4, 5). In particular, the UE can select a first FD component 408, a second FD component 410, a third FD component 412, a fourth FD component 414, a fifth FD component 416, a sixth FD component 418, a seventh FD component 420, and an eighth FD component 422 (as illustrated by the FD components being illustrated with diagonal lines) from the IntS 406 for the CSI feedback in the illustrated embodiment. In the illustrated embodiment, $N_{SB}$ can be equal to 16, R can be equal to two, $p_1$ can be equal to ½, $N_3$ is equal to 32, M is equal to 8, and $N_3'$ is equal to 16. The UE can report the selected FD components to a base station in a CSI report. In particular, the UE can transmit one or more signals to the base station that indicate the selected FD components.

In the illustrated example, according to $M_{initial}$ the intermediate set (IntS) 406 can be known on the gNB side (such as the gNB 2122 of FIG. 21) so that at one spatial layer, for example, the selection of FD components can be only at a spatial layer constrained within the intermediate set (Ints) (e.g., 0, 1, 2, 3, 4, 5). And then another spatial layer still within the intermediate set 406 (28 and 30) can be independent of this spatial layer. Another spatial layer 420 could be different so that the UE may favor the precoder subbands for the CSI feedback corresponding to 0, 1, 3, and 9, and in a separated set from 28, 30 and 31. The UE can select from the eight FD components from the another spatial layer 420 (e.g., 28, 30, 31, 0, 1, 2, 3, and 9), for example, so that the FD component selection can vary among different spatial layers for the CSI report in a UCI transmission for CSI feedback along a time selection.

When a number of FD components are selected for CSI transmission a problem can arise from two spatial layers from the gNB point of view. From a past CSI measurement report by the UE the gNB may be under the impression that for this UE a one to one association is probably most suitable one since it has been reported (e.g., the past 10 occasions/reports). However, the channel can change. From the UE point of view, a rank 2 transmission could be preferred, but in that case the coefficients should be sent to have a change from the rank 1 to the rank 2. Thus, there may not be enough resources to report on both, but then the problem exists that if CSI for one rank is only reported (e.g., spatial layer 0), the base station could be at a loss to generate the precoder for another spatial layer without further information, regardless of whether the gNB knows that the UE can support rank 2 transmission.

Figure 5:
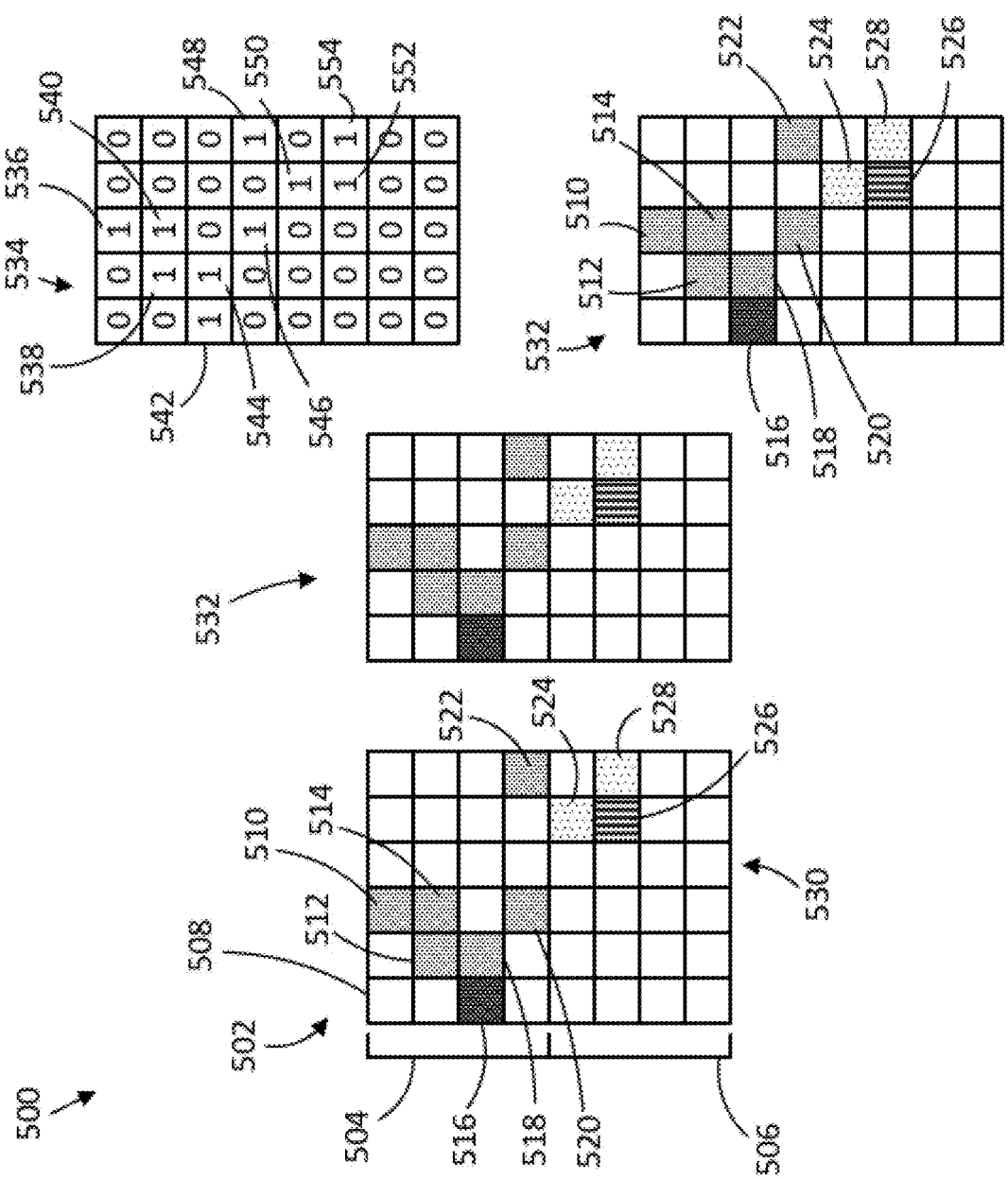
FIG. 5 illustrates a first portion of an example bitmap generation flow in accordance with some embodiments.

FIG. 5 illustrates a first portion of an example bitmap generation flow 500 in accordance with some embodiments. The bitmap generation flow 500 illustrates an example flow that can be performed by a UE (such as the UE 2110 of FIG. 21) to generate a bitmap of linear combination/coefficient (LC) coefficient indications for reporting CSI to a base station (such as the gNB 2122 of FIG. 21). The UE implementing the flow of the bitmap generation flow 500 can reduce the data to be transmitted for a bitmap as compared to simplistic bitmaps by being allowed to select different spatial beams for different antenna polarizations and generate compressed CSI reports through UCI omission.

The bitmap generation flow 500 can include a bitmap 502 for LC coefficients as determined based on measurements by the UE. In particular, the bitmap 502 can indicate values of LC coefficients for signals received from a base station that were measured by the UE. The UE can generate the bitmap 502 based on the determined values of the LC coefficients. Each square of the bitmap 502 can indicate an LC coefficient of signals measured by the UE. An x-axis of the bitmap 502 corresponds to FD-components of the LC coefficients and a y-axis of the bitmap 502 corresponds to selected spatial beams, where each square in the bitmap corresponds to an index of the FD component and an index of the spatial beam(s).

In the illustrated embodiment, the bitmap 502 includes eight selected spatial beams for two antenna polarizations and six FD components. The spatial beams of the bitmap 502 can be divided into a first polarization 504 and a second polarization 506. In particular, the spatial beams corresponding to the top four rows of the bitmap 502 can have the first polarization 504 and the spatial beams corresponding to the bottom four rows of the bitmap 502 can have the second polarization 506.

In the bitmap 502, the boxes that are unfilled indicate that the amplitude of the LC coefficient for the corresponding spatial beam and frequency component is zero; in particular, the UE could have determined that the amplitude of the LC coefficients corresponding to the unfilled boxes is equal to zero. For example, an LC coefficient of a first coefficient 508 has an amplitude of zero in the illustrated embodiment. It should be understood that referring to having an amplitude of zero can not necessarily mean the amplitude of the LC coefficient is precisely zero in some embodiments, but the amplitude of the LC coefficient is within a predefined range of zero in these embodiments. Further, non-zero amplitude in these embodiments can refer to the amplitude of the LC coefficient being larger than the predefined range for zero.

In the bitmap 502, the boxes with fills indicate that the amplitude of the LC coefficient for the corresponding spatial beam and the frequency component is non-zero; in particular, the UE could have determined that the amplitude of the LC coefficients to be non-zero. For example, the UE could have determined that the second coefficient 510, the third coefficient 512, the fourth coefficient 514, the fifth coefficient 516, the sixth coefficient 518, the seventh coefficient 520, the eighth coefficient 522, the ninth coefficient 524, the tenth coefficient 526, and the eleventh coefficient 528 have amplitudes that are non-zero. As can be seen from the bitmap, the second coefficient 510 through the eighth coefficient 522 have the first polarization 504 and the ninth coefficient 524 through the eleventh coefficient 528 have the second polarization 506.

The UE can determine whether any of the FD components of the bitmap 502 are without any non-zero LC coefficient values. For example, the UE can determine an FD component 530 corresponding to the fourth column in the bitmap 502 does not include any LC coefficients with non-zero amplitudes. Based on the UE determining that an FD component does not include any LC coefficients with non-zero amplitudes, the UE can remove the FD component from the bitmap 502 to produce a modified or compressed bitmap. In particular, the UE can remove the column corresponding to the FD component from the bitmap 502 causing the modified bitmap to be smaller than the bitmap 502. In the illustrated embodiment, the UE can remove the FD component 530 to produce a modified/compressed bitmap 532 without the FD component. As part of removing an FD component 530, the UE may not report the values of the LC coefficients within the FD component 530. In contrast, the UE can include an indication of the FD component that has been removed from bitmap 502 in a report rather than the values of each of the LC coefficients in the FD component, which can result in less bits being include in the report and less overhead. In addition, or alternatively, the UE can indicate a subset of selected 2L spatial beams to reduce the size of the bitmap. The modified bitmap 532 can maintain the rest of the FD components and the LC coefficient values from the bitmap 502.

For understanding, the illustrated bitmap generation flow 500 further includes a non-zero indication bitmap 534. The non-zero indication bitmap 534 can indicate which components of the modified bitmap 532 have non-zero values and which components of the modified bitmap have zero values. In particular, the non-zero indication bitmap 534 indicates a '1' in component locations for LC coefficients with non-zero values and a '0' in component locations for LC coefficients with zero values. In the illustrated example, the non-zero indication bitmap 534 has a first coefficient 536, a second coefficient 538, a third coefficient 540, a fourth coefficient 542, a fifth coefficient 544, a sixth coefficient 546, a seventh coefficient 548, an eighth coefficient 550, a ninth coefficient 552, and a tenth coefficient 554 that indicate a '1' based on the corresponding LC coefficients being non-zero values. The rest of the components of the non-zero indication bitmap 534 can indicate a '0' based on the corresponding LC coefficients being zero values. The first coefficient 536 of the non-zero indication bitmap 534 corresponds to second coefficient 510 from the modified bitmap 532, the second coefficient 538 of the non-zero indication bitmap 534 corresponds to the third coefficient 512 of the modified bitmap 532, the third coefficient 540 of the non-zero indication bitmap 534 corresponds to the fourth coefficient 514 of the modified bitmap 532, the fourth coefficient 542 of the non-zero indication bitmap 534 corresponds to the fifth coefficient 516 of the modified bitmap 532, the fifth coefficient 544 of the non-zero indication bitmap 534 corresponds to the sixth coefficient 518 of the modified bitmap 532, the sixth coefficient 546 of the non-zero indication bitmap 534 corresponds to the seventh coefficient 520 of the modified bitmap 532, the seventh coefficient 548 of the non-zero indication bitmap 534 corresponds to the eighth coefficient 522 of the modified bitmap 532, the eighth coefficient 550 of the non-zero indication bitmap 534 corresponds to the ninth coefficient 524 of the modified bitmap 532, the ninth coefficient 552 of the non-zero indication bitmap 534 corresponds to the tenth coefficient 526 of the modified bitmap 532, and the tenth coefficient 554 of the non-zero indication bitmap 534 corresponds to the eleventh coefficient 528 of the modified bitmap 532.

Figure 6:
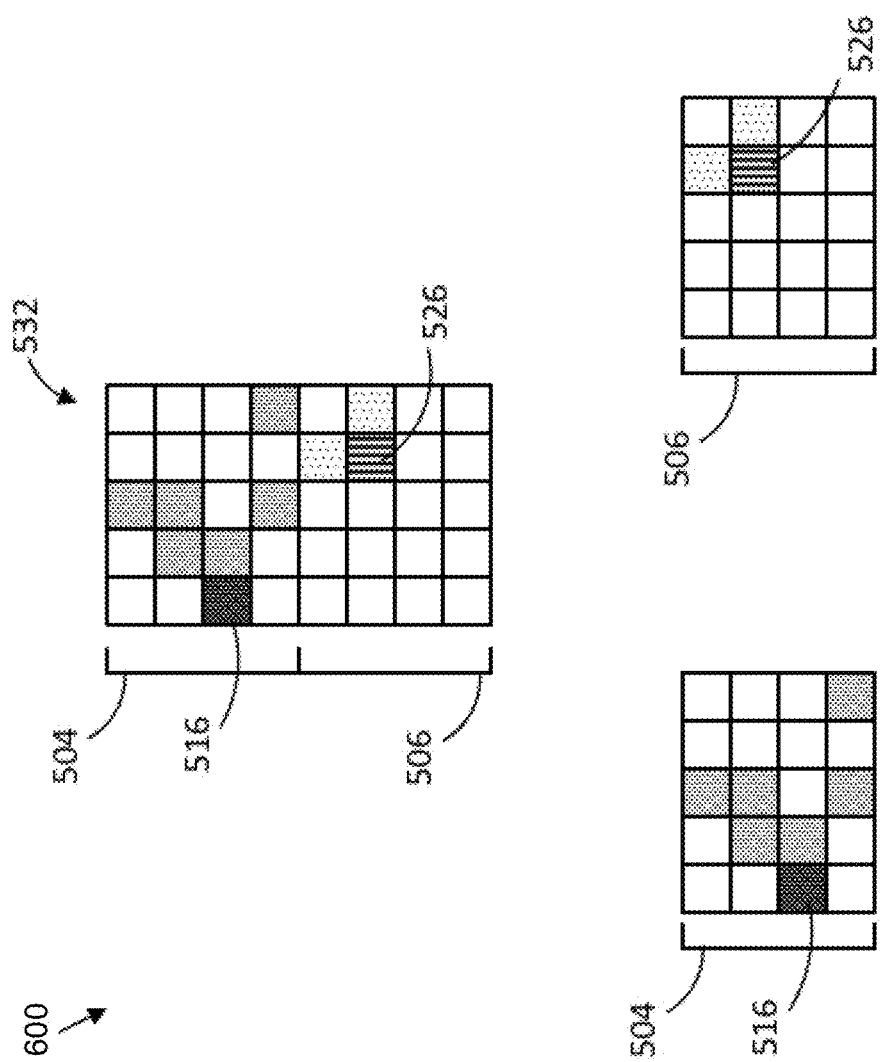
FIG. 6 illustrates a second portion of the example bitmap generation flow in accordance with some embodiments.

FIG. 6 illustrates a second portion 600 of the example bitmap generation flow 500 in accordance with some embodiments. For example, the second portion of the example bitmap generation flow 500 can proceed with the modified or compressed bitmap 532 produced from the first portion of the example bitmap generation flow 500. For each polarization, the UE (such as the UE 2110 of FIG. 21) can identify a reference, and the stronger one can be used by the UE to normalize all the LC coefficients.

The UE can determine a strongest LC coefficient from the LC coefficients included in the modified bitmap 532. In particular, the UE can determine the LC coefficient with the largest amplitude included in the modified bitmap 532. In the illustrated embodiment, the UE could determine that the fifth coefficient 516 is the strongest LC coefficient based on the fifth coefficient 516 having the largest amplitude of the LC coefficients included in the modified bitmap 532, for example.

The UE can further determine which polarization includes the strongest LC coefficient. For example, the UE can determine whether the strongest LC coefficient has the first polarization 504 or the second polarization 506 in the illustrated embodiment. In the illustrated embodiment, the UE can determine that the fifth coefficient 516 has the first polarization 504, for example.

The UE can also determine the strongest LC coefficient from the other polarizations that do not include the strongest LC coefficient of the entire modified bitmap 532. For example, as the UE determined that the strongest LC coefficient in the illustrated embodiment has the first polarization 504, the UE can determine which LC coefficient having the second polarization 506 has the largest amplitude. In the illustrated embodiment, the UE can determine that the tenth coefficient 526 has the strongest LC coefficient of the LC coefficients with the second polarization 506.

The UE can normalize the non-zero LC coefficients of the modified bitmap 532 based on the strongest LC coefficient of the modified bitmap 532. In particular, the UE can divide the value of all the LC coefficients having non-zero amplitudes by the value of the strongest LC coefficient in the modified bitmap 532. For example, the UE can divide the values of the non-zero LC coefficients of the modified bitmap 532 by the value of the fifth coefficient 516 to normalize the non-zero LC coefficients. For example, the UE can perform a high resolution amplitude quantization with the LC coefficients within the modified bitmap 532 by the normalizing values for the LC coefficients within the modified bitmap 532 and quantizing the normalized values to selected digital values. The UE can perform normal resolution amplitude quantization and/or phase quantization with the LC coefficients with the first polarization 504 by dividing the LC coefficients into LC coefficients with the first polarization 504 and LC coefficients with the second polarization 506. Additionally, or alternatively, the UE can perform phase quantization with the LC coefficients with the first polarization 504. Additionally, or alternatively, the UE can perform phase quantization to indicate the phase of the LC coefficients in the first polarization 504, in which, for example, the UE can perform phase quantization with the LC coefficients with the first polarization 504 to 16 phase shift keying (PSK). The phase can be based on an FD component of the strongest LC in the polarization. In the illustrated embodiments, the strongest LC for the first polarization 504 can be the fifth coefficient 516, which is in the first FD component of the modified bitmap 532 and has a phase of zero. As the phase in the illustrated embodiment of the first polarization 504 is zero, the phase quantization would result in the phase value of the first polarization 504 being zero. Accordingly, the phase quantization can be skipped in the illustrated embodiment since the phase value for the fifth coefficient 516 would be the same before and after the phase quantization. The UE can also perform normalization, normal resolution amplitude quantization, and/or phase quantization for the LC coefficients of the second polarization 506 in a similar manner also, in which the strongest LC coefficient of the second polarization 506 can be the tenth coefficient 526.

Figure 7:
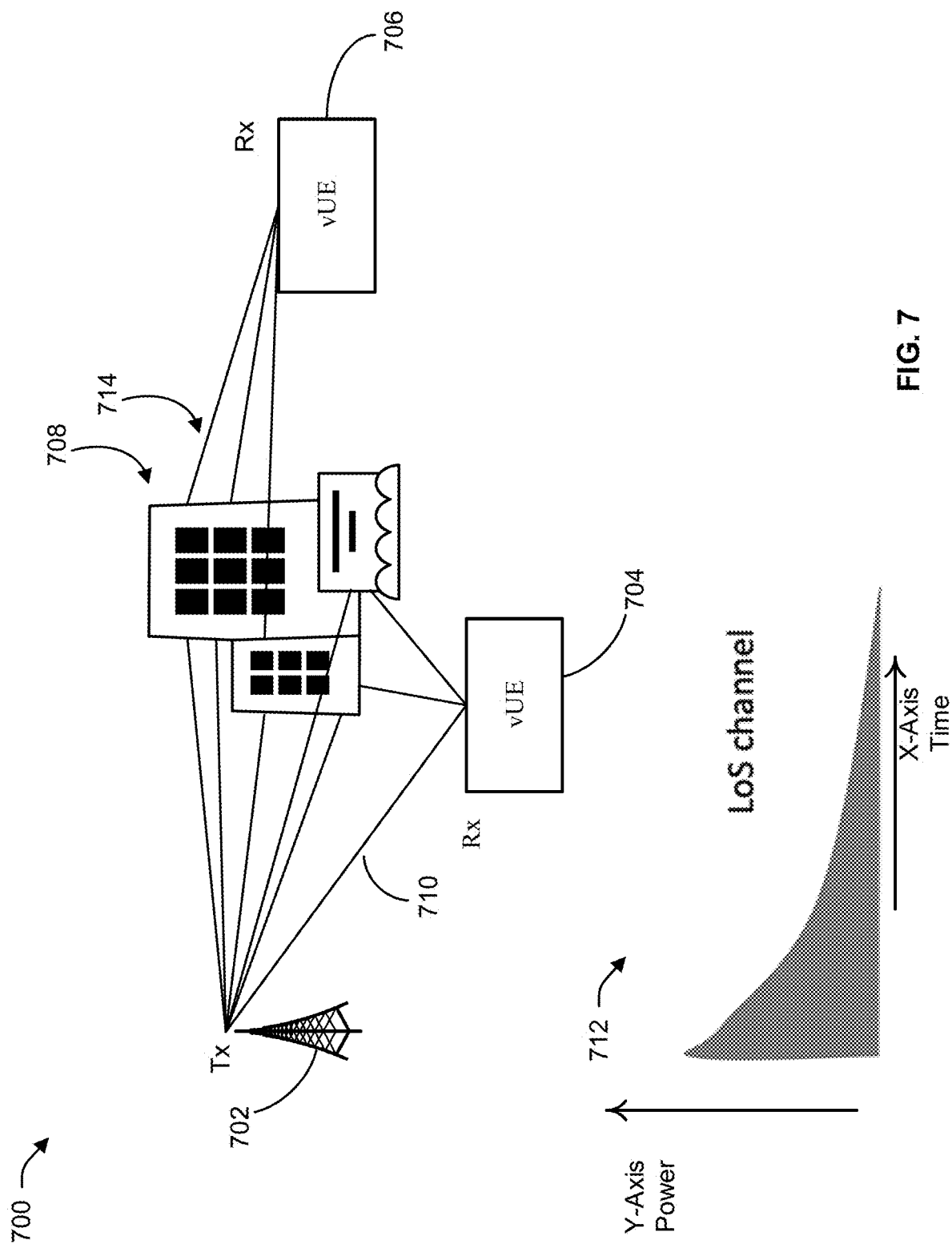
FIG. 7 illustrates an example multi-path scenario with direct line of sight (LoS) channels and non-LoS channels in a mobile scenario in accordance with various embodiments.

FIG. 7 illustrates various examples in application of transmission paths between a base station 702 (e.g., gNB) and fast moving UEs 704, 706 (e.g., vehicle UEs (vUEs)) or a high speed rail (HSR). Various objects 708 (e.g., buildings, trees, or the like) can cause certain paths to arrive later or less quickly than other direct paths between base station 702 and UEs 704, 706. For example, a path between base station 702 and UE 704 includes a direct path that has a direct line of sight (LoS) channel 710, and thus, the path reaches the vehicle UE faster than other paths to the UE 704. Channel paths between the base station 702 and UE 706 that result through a reflection of objects 708 (e.g., one or more buildings) as non-LOS (NLOS) paths 714 with a longer arrival. For the LoS channel 710, a stronger path occurs at the beginning, but a weaker path may result after moving, which may be attenuated or take longer through reflection.

As illustrated at the power delay profile 712, the intensity of a signal received through a multi-path channel can be a function of a time delay, which is a difference in travel time between multiple paths. As the time delay increases along the X-axis, power decreases in decibels along the Y-axis in a linear domain.

Figure 8:
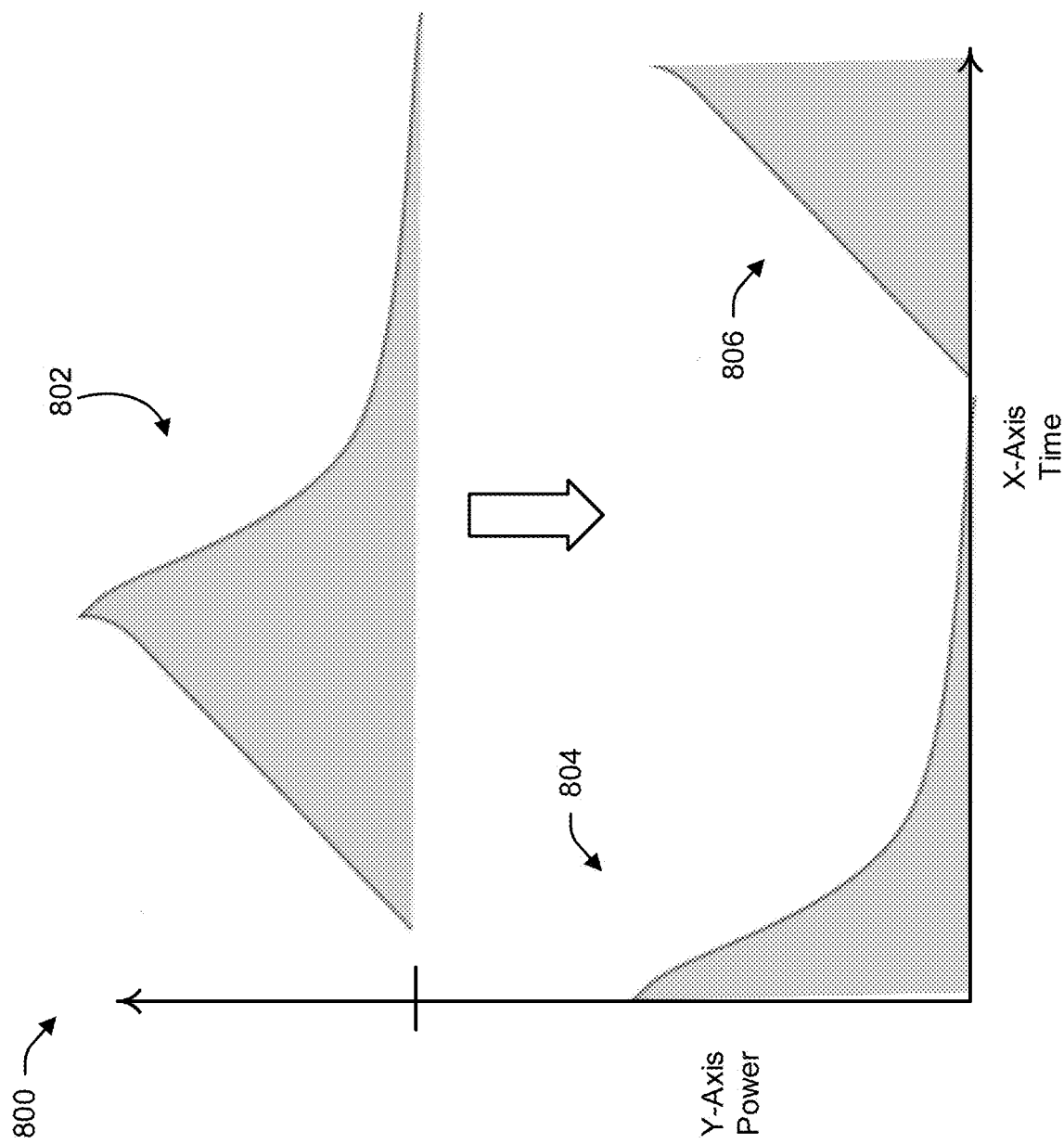
FIG. 8 illustrates an example cyclic shift of a non-LoS power profile in accordance with various embodiments.

In embodiments, generating CSI feedback in a CSI report can include performing a cyclic shift of the strongest path to a first position (e.g., at an origin) as illustrated in FIG. 8. Different portions of a representation of the channel power delay profile for an NLoS profile 802 can be divided so that in the linear domain two portions 804 and 806 of the representation can be separated, but in a cyclical shift domain the portions are neighbors. The strongest path(s) can be cyclically shifted, for example, to a position of an axis origin with portion 804. In various embodiments, the UE (such as the UE 2110 of FIG. 21) can select coefficients with a cyclical domain when generating the CSI feedback. CSI omission can be performed when resources are exceeded for a CSI report by selecting more significant coefficients of FD components and/or TD components that have been cyclically shifted in the power delay domain/power Doppler domain. Ideally with a direct path only, the channel response seen at the UE side would be a delta function. For the LoS channel path a delta function can be assumed for the power delay profile: a first tap or FD component is the strongest, with no significant power necessarily preceding the strongest tap at the origin. However, due to bandwidth limitation, the effective wireless signal observed by the UE can be a convolution of the wireless channel and a time domain response of a band-limiting filter, as characterized by a sync function. As a sync function can have some small signal leakage prior to the channel, and the composite channel with the LoS can also have non-zero paths prior to the strongest path. For this reason, shifting a strongest path to the zero position and selecting a coefficient alternatively here can carry additional benefit.

In particular, regarding rank 2 transmission at a spatial layer for a spatial beam, for example, multiple spatial beams can be generated from the base station transmission to the UE. Different spatial beams can be combined and assigned different coefficients for forming a transmission direction. A strongest spatial path can be designated with strongest coefficient within a particular neighborhood or range. Thus, when configuring CSI omission various permutations along the range can be assigned priorities based on a priority function. In response to resources being exceeded for a full CSI report, less important components can be eliminated to ensure there is not an overhead issue.

Figure 9:
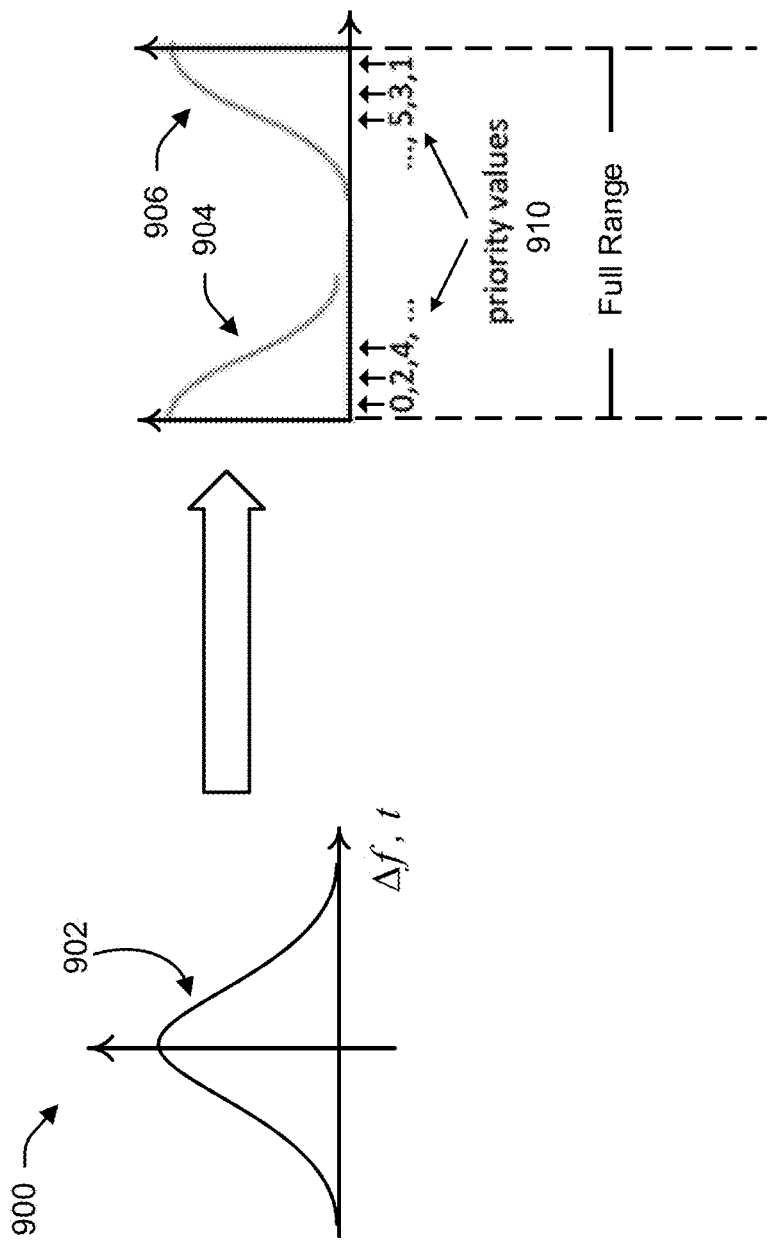
FIG. 9 illustrates an example priority assignment to components of frequency domain (FD) or time domain (TD) components cyclically shifted in a wrap-around process in accordance with various embodiments.

FIG. 9 illustrates an example of a cyclic shift of a power profile 900 with priority values for components of MIMO codebook. For example, power profile 902 can be cyclically shifted so that the cyclic shift is in the frequency domain for TD components and in the time domain for FD components, along the horizontal axis. If TD components are being represented such that the cyclic shift performed is in an TD component domain, then the horizontal axis represents a change in frequency. Additionally, or alternatively, if FD components are being represented such that the cyclic shift is perform in an FD component domain, the horizontal axis represents a change in time.

The power profile 902 can be selected as the strongest path between the UE (such as the UE 2110 of FIG. 21) and base station for any one path of a multi-path communication. This profile 902 gets cyclically shifted so that neighbor profile portions 904 and 906 are arranged on right and left along a full range. The strongest component as the strongest path can be placed at an origin or zero position and designated with a lowest priority value as a highest priority. The highest priority can then be read out first in a read out sequence for the CSI report. As such, the read out sequence can alternate from right profile portion 904 to left profile portion 906 iteratively through all components in a cyclic manner. Then based on an allocated resource amount, the UE can select which components are included in the CSI report. If the amount of resources (e.g., resource elements, number of physical resource blocks (PRBs), number of orthogonal frequency division multiplexing (OFDM) slots, or the like) increases or decreases, more or less components could be selected for the CSI report.

Depending on a resource amount allocated to the UE for the CSI report, the UE can read out different components in various manners. The UE can read out FD components with a permutation first, TD components with a permutation second, by spatial beam, and then spatial layer. Alternatively, or additionally, the UE can read out FD components with a permutation first, by spatial beam, TD components with a permutation, and then by spatial layer. Alternatively, or additionally, the UE can read out FD components with a permutation, by spatial beam, by spatial layer, and then TD components with a permutation. The permutation can be determined according to an ordering of a priority function, for example.

Based on the priorities of the read outs above the UE can select which components of linear coefficient (LC) coefficients or LC coefficients to omit from the CSI report in a UCI transmission. For example, according to the illustration, if priority value 0 represents a strongest component (FD component/TD component), the UE could decide to read out this component for the report first. The strongest component can be designated a priority value of zero in the left profile 904, such that lower is better. Then the next would be priority value one in the right profile 906. The UE can iteratively go back and forth between the two neighbor profiles 904 and 906 to obtain components that cluster around a strong signal. Those with non-zero coefficients can be selected and reported in the CSI report based on a threshold level of resources being allocated for the UCI transmission with the CSI report, for example.

CSI omission can be configured when the allocated UL resource for UCI is not sufficient for a full CSI reporting, or a reporting of all coefficients, for example. Each component selected can be based on the priority values 910 for components with LC coefficients (LCCs) that include a non-zero LC coefficient. The non-zero LC coefficient can be denoted according to an associated spatial layer, beam, FD component basis, and/or TD component basis. Without a TD basis, for example, the non-zero LC coefficient (NZC) can be denoted as $c_{l,m}^{(\lambda)}$, associated with spatial layer $\lambda \in \{0, 1, \ldots, RI-1\}$, spatial beam $l \in \{0, 1, \ldots, 2L-1\}$, and FD-basis $m \in \{0, 1, \ldots, M-1\}$. The associated bitmap component (including zero(s)) can be represented as: $\beta_{l,m}^{(\lambda)}$. Here, the spatial layer $\lambda$ can be indexed based on a Rank Indicator (RI), a spatial beam l based on a size of the spatial beam (2L), and FD component basis m based on a number of FD components. Additionally, with a TD component basis being considered, for example, the NZC can be denoted as $c_{l,m,d}^{(\lambda)}$, and associated with layer $\lambda \in \{0, 1, \ldots, RI-1\}$, beam $l \in \{0, 1, \ldots, 2L-1\}$, FD-basis $m \in \{0, 1, \ldots, M-1\}$, and TD-basis $d \in \{0, 1, \ldots, M_d-1\}$ as $c_{l,m,d}^{(\lambda)}$. The associated bitmap component (including zero(s)) can be represented as: $\beta_{l,m}^{(\lambda)}$.

Figure 10:
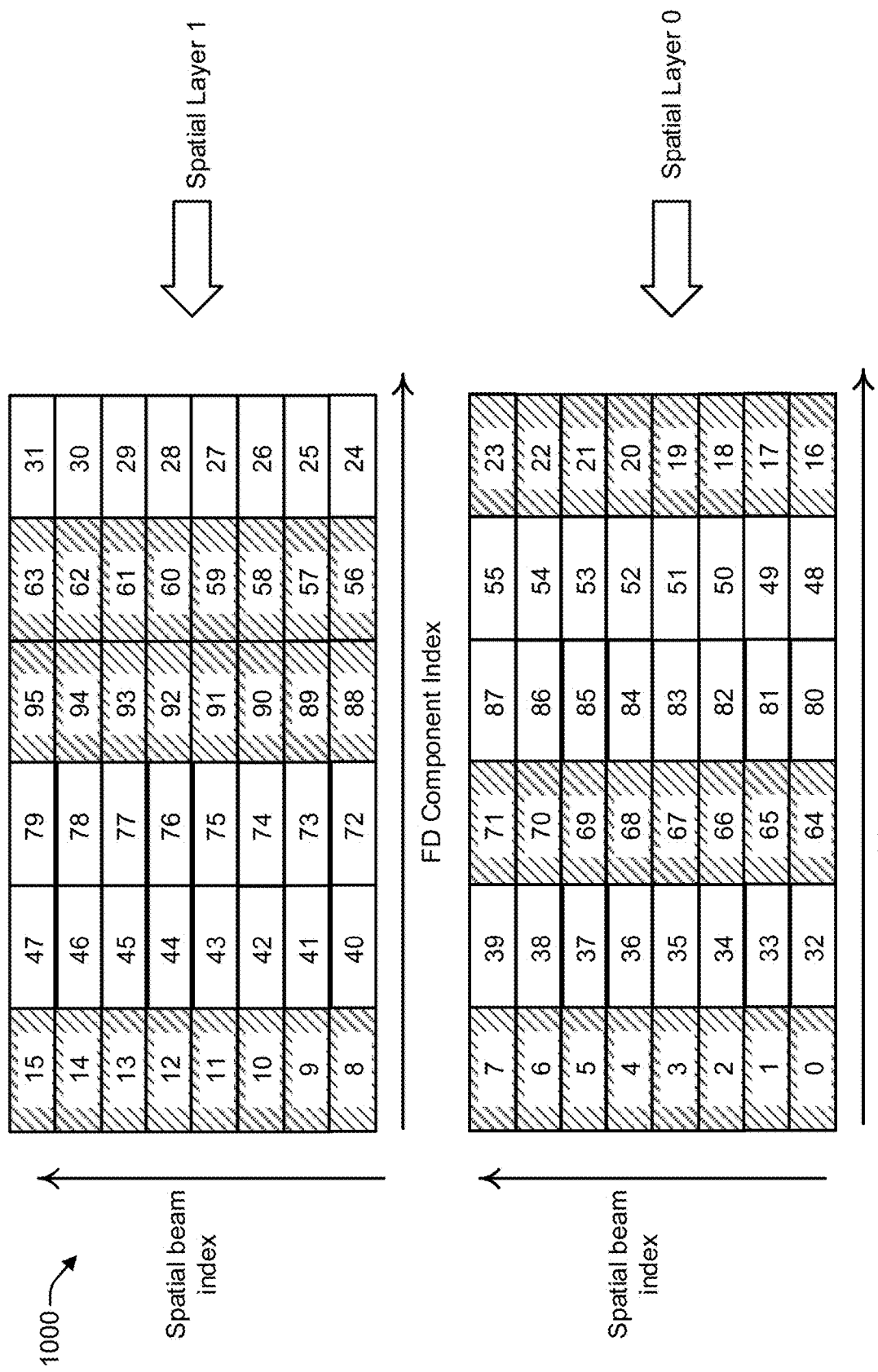
FIG. 10 illustrates an example read out sequence of FD components across different spatial layers in accordance with various embodiments.

FIG. 10 illustrates an example read out sequence 1000 for a plurality of spatial layers. FD components are along the horizontal axis with spatial beams indexed along the vertical axis. In the illustration, eight spatial beams are represented along the vertical axis for each spatial layer (e.g., spatial layer 0 and spatial layer 1). When it is determined that allocated resources are exceeded by generating a CSI report and UCI omission occurs, a selective read out can be configured in such a manner. Although TD components are not illustrated, a similar read out sequence can be performed with TD components also to reduce or compress the CSI report. This enables the chance to provide CSI feedback for multiple layers, even though a CSI report with full information is not provided.

The fill portions with diagonal hashes represent FD components (or taps) that are selected and can include non-zero LC coefficients, for example. As detailed above with FIGS. 3 and 4, different spatial layers can be different, as shown here the diagonal hashed components represent FD components among different ranks or different spatial layers. In this read out sequence, the spatial beams can be read out first, then the spatial layer, and then the FD components are read out. The read out sequence itself is irrespective of whether a non-zero selection component is present or not in order to characterize priority and select parameters for UCI omission. The UE (such as the UE 2110 of FIG. 21) iteratively goes through a left neighbor profile (e.g., 904 of FIG. 9) represented by coefficients 0, 1, 2, 3, 4, 5, 6, and 7 for one spatial layer, and then 8, 9, 10, 11, 12, 13, 14 and 15 for the next spatial layer; this is the point of origin with the FD component considered as the strongest. Then a wrap-around procedure is performed in which a right neighbor profile (e.g., 906) is considered from a cyclic shift, as discussed earlier with respect to FIG. 9 (e.g., left neighbor profile 904 and right neighbor profile 906). The next strongest component is usually on the next iteration and alongside the strongest candidate on the right side as represented as 16, 17, 18, 19, 20, 21, 22, and 23 in spatial layer 0 and then 24 thru 31 in the next spatial layer. The iterative read out thus moves from spatial beam, to spatial layer, and then to FD components with permutation. The wrap-around iteration continues along the next components on the left side from 32 thru 47, and then on the right side from 48 thru 63. The wrap-around of the cyclic shift profiles continues iteratively at the left side with 64 thru 79 and then back to the right finally with 80 thru 95 until the iterations are complete in reading out the spatial beams, spatial layers and FD components with non-zero LC coefficients. In this manner, the UE can then select components for the CSI report to feedback in a UCI transmission and determine which parameters to omit, for example.

Figure 11:
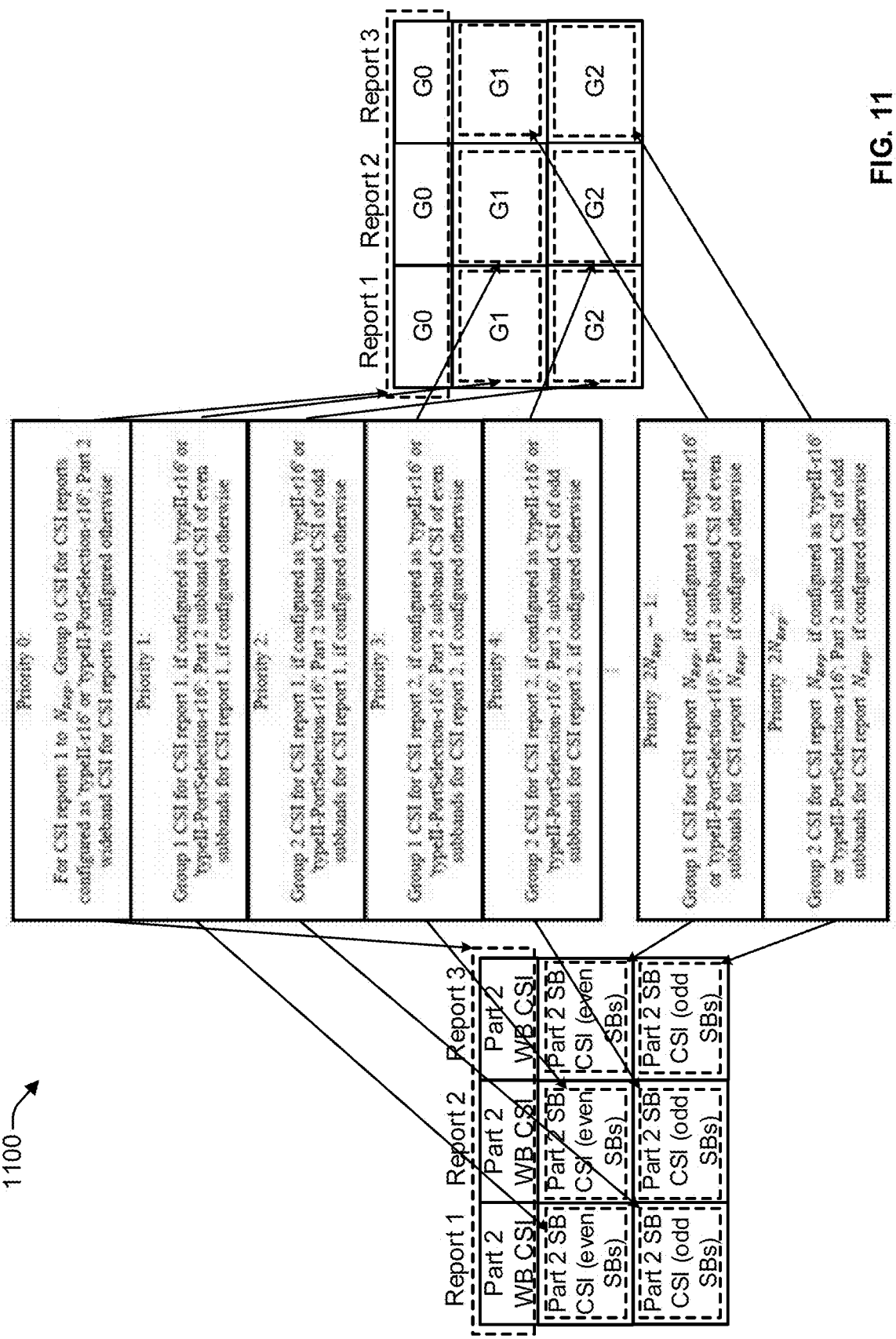
FIG. 11 illustrates an example division of UCI part 2 group divisions in accordance with various embodiments.

FIG. 11 illustrates an example of CSI/UCI reporting 1100 in CSI Part 2 (UCI Part 2). For purposes of UCI omission in the CSI report, the parameters in UCI Part 2 can be divided into 3 groups where Group n is of a higher priority than Group (n+1), n=0, 1. 3GPP specifications define a single CSI feedback for division into two parts. Part 1 is considered very essential, while part 2 CSI can be considered less important parameters but meaningful for scheduling with the gNB (such as the gNB 2122 of FIG. 21).

For part 2 CSI, the codebook can be defined according to three Groups, 0, 1 and 2. When the UE (such as the UE 2110 of FIG. 21) is configured to report $N_{Rep}$ CSI reports, Group 0 can include, but is not limited to or confined by, parameters such as SD rotation factors, SD indicator, SCI(s) for all the $N_{Rep}$ reports, or other more essential or priority parameters for Group 0 of part 2 CSI/UCI than Group 1 and Group 2. The exact parameters that can be included in Group 0 can depend on various factors in the codebook design and could vary to include more or less other parameters than discussed, and this is the same for Group 1 and 2 discussed below.

A priority level can be defined such that if priority levels of two LCCs $c_{l_1,m_1}^{(\lambda_1)}$ and $c_{l_2,m_2}^{(\lambda_2)}$ are such that Prio($\lambda_2,l_2,m_2$)<Prio($\lambda_1,l_1,m_1$), LCC $c_{l_2,m_2}^{(\lambda_2)}$ has a higher priority over $c_{l_1,m_1}^{(\lambda_1)}$. Non-zero LC coefficients $c_{l,m}^{(\lambda)}$ and bits of bitmap $\beta_{l,m}^{(\lambda)}$ are prioritized/ordered from high to low priority according to ($\lambda,l,m$) with the same priority function Prio($\lambda,l,m$). The priority level can be calculated as Prio($\lambda,l,m$) =2L·RI·P(m)+RI·l+$\lambda$ where P(m) maps the index m according to the following order of the corresponding FD components (if selected): 0, $N_3$−1, 1, $N_3$−2, 2, . . . .

For each of the $N_{Rep}$ reports, Group 1 can include, but not limited to or confined by, reference amplitude(s) for weaker polarization, FD indicator, the $\lceil K_{NZ}^{TOT}/2 \rceil$ highest priority non-zero LC coefficients $c_{l,m}^{(\lambda)}(\{c_{l,m}^{(\lambda)}, (\lambda,l,m)\in G_1\})$, and the RI·2LM−$\lfloor K_{NZ}^{TOT}/2 \rfloor$ highest priority bits of bitmap $\beta_{l,m}^{(\lambda)}$. For each of the $N_{Rep}$ reports, Group 2 can include, but not limited to or confined by: the $\lfloor K_{NZ}^{TOT}/2 \rfloor$ lowest priority non-zero LC coefficients $c_{l,m}^{(\lambda)}(\{c_{l,m}^{(\lambda)}, (\lambda,l,m) \in G_2\})$ and the $\lfloor K_{NZ}^{TOT}/2 \rfloor$ lowest priority bits of bitmap $\beta_{l,m}^{(\lambda)}$. Both Group 1 and Group 2 can be populated from dividing or partitioning the bitmap and associated LC coefficients in such a manner that the base station may still receive a UCI transmission with the CSI report and a size of Groups 1 and 2 also. Group 1 ($G_1$) and Group 2 ($G_2$) can exclude the indices associated with the strongest coefficient(s). Indices can be jointly indicated for both phase and amplitude.

In the illustrated example, each report (e.g., Report 1, Report 2 and Report 3) include different parameters that are selected for Part 2 CSI in $G_1$ and $G_2$. Group 0 ($G_0$) include more essential parameters for Part 2 wideband across reporting and would avoid UCI omission, for example. These can be designated, for example, as priority 0: For CSI reports 1 to NRep, Group 0 CSI for CSI reports configured as 'typeII-r16' or 'typeII-PortSelection-r16'; Part 2 wideband CSI for CSI reports configured otherwise. Priorities 1 thru 2 $N_{Rep}$ can include subband parameters according to even or odd subbands for example and be selected for $G_1$ or $G_2$ as indicated by the associated arrows of each priority reporting level. Priority 1 can be selected for $G_1$ in report 1 and include: Group 1 CSI for CSI report 1, if configured as 'typeII-r16' or 'typeII-PortSelection-r16'; Part 2 subband CSI of even subbands for CSI report 1, if configured otherwise. Priority 2 can be selected for $G_2$ in report 1 and include: Group 2 CSI for CSI report 1, if configured as 'typeII-r16' or 'typeII-PortSelection-r16'; Part 2 subband CSI of odd subbands for CSI report 1, if configured otherwise. Priority 3 can be selected for $G_1$ in report 2 and include: Group 1 CSI for CSI report 2, if configured as 'typeII-r16' or 'typeII-PortSelection-r16'; Part 2 subband CSI of even subbands for CSI report 2, if configured otherwise. Priority 4 can be selected for $G_2$ in report 2 and include: Group 2 CSI for CSI report 2, if configured as 'typeII-r16' or 'typeII-PortSelection-r16'. Part 2 subband CSI of odd subbands for CSI report 2, if configured otherwise. The report can be generated likewise with Priority 2 $N_{Rep}$−1, for example, being selected for $G_1$ further being included in report 3 and include: Group 1 CSI for CSI report $N_{Rep}$, if configured as 'typeII-r16' or 'typeII-PortSelection-r16'; Part 2 subband CSI of even subbands for CSI report, if configured otherwise. Priority 2 $N_{Rep}$ can be selected for $G_2$ in report 3 and include: Group 2 CSI for CSI report $N_{Rep}$, if configured as 'typeII-r16' or 'typeII-PortSelection-r16'; Part 2 subband CSI of odd subbands for CSI report $N_{Rep}$, if configured otherwise.

The UE can thus partition different UCI parameters to 3 three groups with the most key parameters in CSI/UCI part 2 being included into G0, the first portions of next important (next highest priority) parameters in UCI part 2 included into G1, and the second portions of next important (next highest priority) parameters in UCI part 2 included into G2. The priority function can be used to determine effectively next important parameters' membership in first portions or second portions of UCI Part 2. This omission design can be formulated as FD component first, spatial beam second, spatial layer third mapping, with FD component permutation considering the power-delay profile, which can be denoted as (FD components with permutation, spatial beam, spatial layer). However, the omission design is not limited to this specifically and can also include TD components with permutation across different pages with frequency offsets for each spatial layer.

Figure 12:
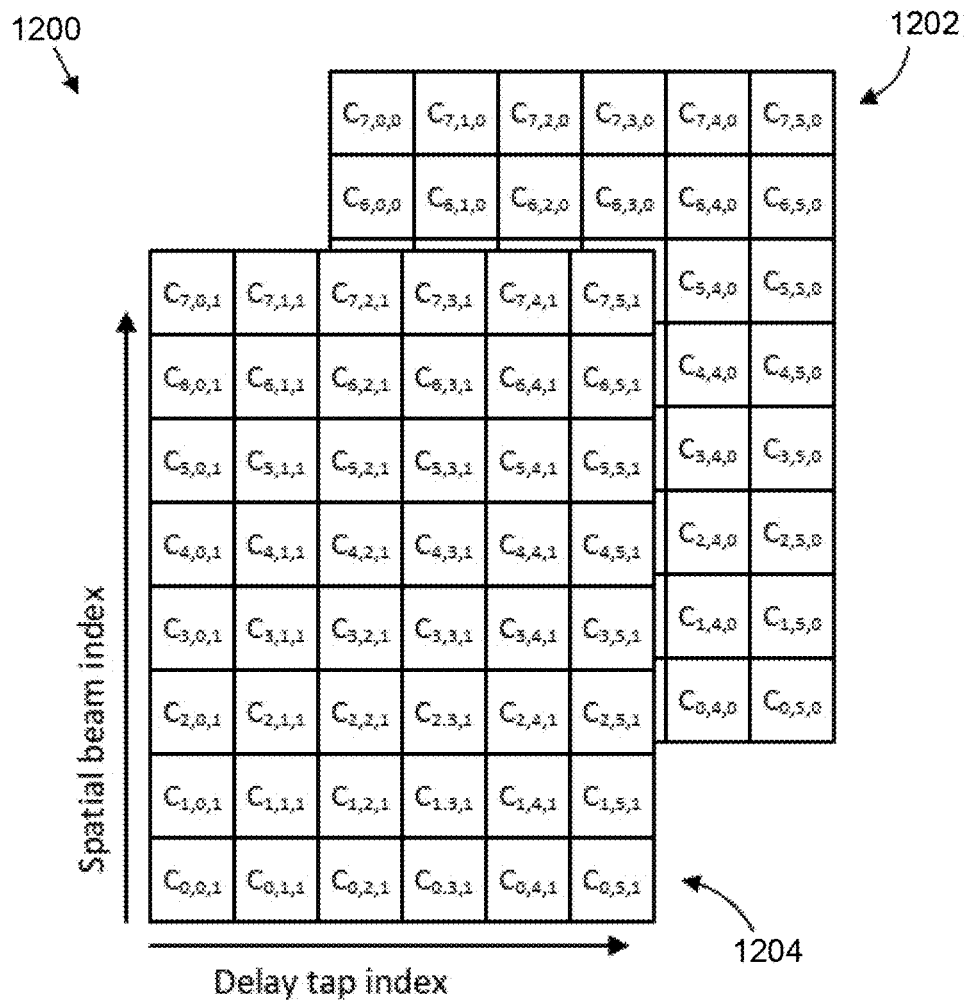
FIG. 12 illustrates an example codebook with single sheets and power delay profiles in accordance with some embodiments.

In some embodiments, a codebook configuration can be configured to implement multiple sheets (also referred to as "pages") for a codebook within a codebook design. FIG. 12 illustrates an example codebook 1200 with single sheets and power delay profiles 1250 in accordance with some embodiments. In particular, the codebook 1200 can have a single sheet for each spatial layer.

The illustrated codebook 1200 can be for two spatial layers. In particular, the codebook 1200 can include a first sheet 1202 for a first spatial layer (which can be referred to as "spatial layer 0") and a first sheet 1204 for a second spatial layer (which can be referred to as "spatial layer 1"). The first sheet 1202 can include precoding definitions for the first spatial layer and the first sheet 1204 can include precoding definitions for the second spatial layer. The base stations and/or UEs can utilize the precoding definitions of the first sheet 1202 for precoding signals transmitted in the first spatial layer and the precoding definitions of the first sheet 1204 for precoding signals transmitted in the second spatial layer. The illustrated case in FIG. 12 can arise due to insignificant Doppler frequency components in the codebook other than the zero frequency offset component after shifting the frequency offsets as described above, for example, for stationary UE, stationary gNB and stationary propagation environment. Because there is only a single sheet in the CSI feedback for spatial layer 1 and also a single sheet in the CSI feedback for spatial layer 2, the Doppler frequency index is omitted in the linear combination coefficient notations shown in FIG. 12, $C_{l,m,\lambda}$ instead of $C_{l,m,d,n}$ is used. It can also happen at one spatial layer, there is only one sheet but there are multiple sheets at another spatial layer.

The power delay profiles 1250 can illustrate power delay profiles at a spatial beam for the spatial layers. In particular, the power delay profiles 1250 can include a first power delay profile 1252 and a second power delay profile 1254. The first power delay profile 1252 can correspond to the first spatial layer and the second power delay profile 1254 can correspond to the second spatial layer. As can be seen, the first power delay profile 1252 can peak at an earlier time than the second power delay profile 1254, such that the first signal corresponding to a spatial beam at the first spatial layer peaks at a different time than the second signal corresponding to the spatial beam at the second spatial layer.

Figure 13:
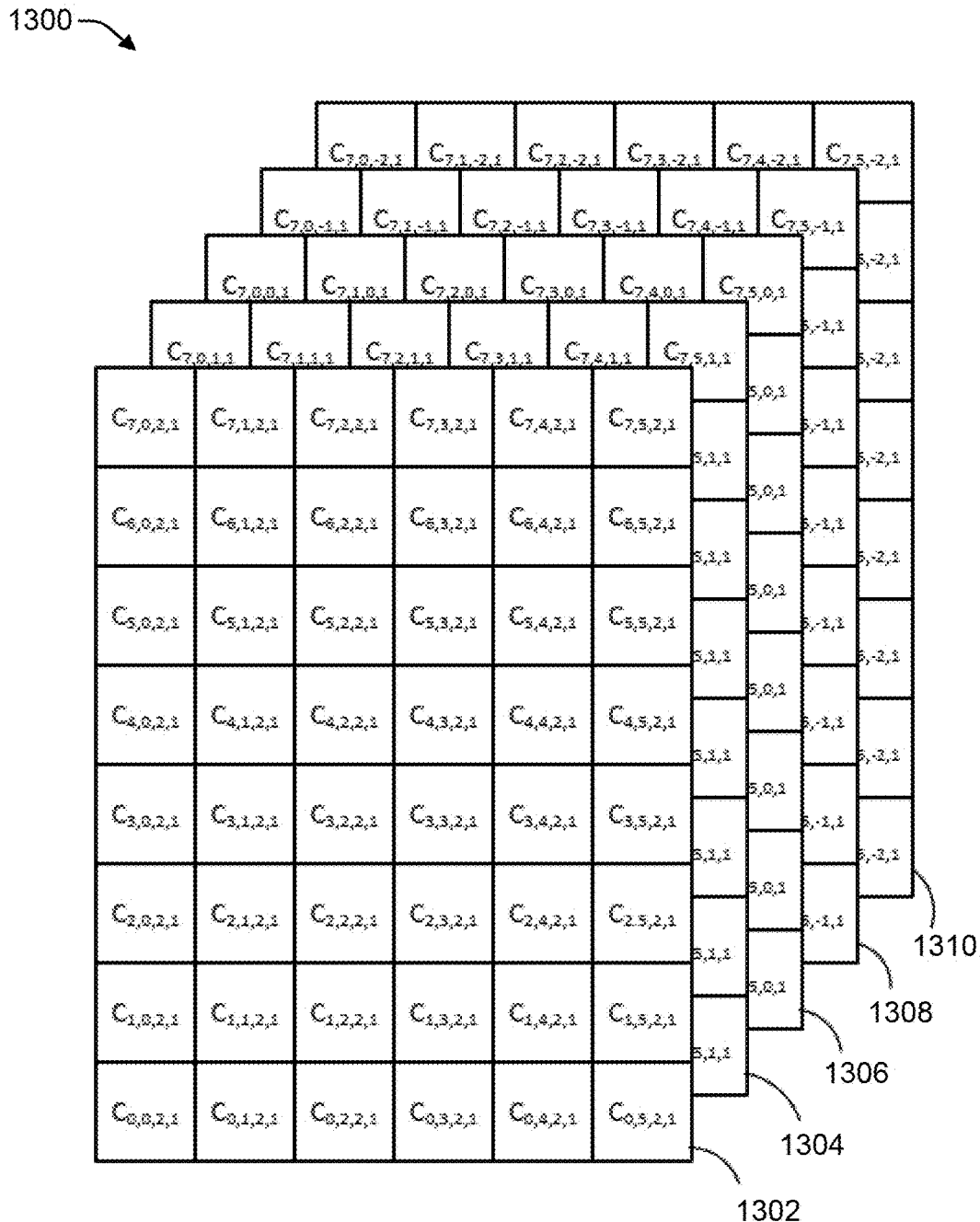
FIG. 13 illustrates a portion of codebook with multiple sheets in accordance with some embodiments.

FIG. 13 illustrates a portion of codebook 1300 with multiple sheets in accordance with some embodiments. Each sheet can correspond to a Doppler frequency offset. In particular, the portion of the codebook 1300 can be an example of a portion of the codebook 1300 corresponding to a single spatial layer. In FIG. 13, linear combination coefficients $C_{l,m,d,\lambda}$ for $\lambda=1$, $0 \leq l \leq 8-1$, $0 \leq m \leq 6-1$, $-2 \leq d \leq 2$ are shown. Additional spatial layers other than spatial layer 1 (e.g., spatial layer zero, or the like) can also be similarly represented with multiple sheets as 3D matrix codebook 1300 composed of TD components and FD components at a given spatial layer.

The portion of the codebook 1300 can include multiple sheets corresponding to a single spatial layer. For example, the portion of the codebook 1300 can include five sheets corresponding to a single spatial layer in the illustrated embodiment. In particular, the portion of the codebook 1300 can include a first sheet 1302, a second sheet 1304, a third sheet 1306, a fourth sheet 1308, and a fifth sheet 1310.

Each of the sheets can correspond to one frequency offset. For example, the third sheet 1306 can correspond to the spatial layer without a frequency offset, which can be represented as frequency offset $0 \cdot \Delta f$. The second sheet 1304 can correspond to the spatial layer with a frequency offset of positive one, which can be represented as frequency offset $1 \cdot \Delta f$. The first sheet 1302 can correspond to the spatial layer with a frequency offset of positive two, which can be represented as frequency offset $2 \cdot \Delta f$. The fourth sheet 1308 can correspond to the spatial layer with a frequency offset of negative one, which can be represented as frequency offset $-1 \cdot \Delta f$. The fifth sheet 1310 can correspond to the spatial layer with a frequency offset of negative 2, which can be represented as frequency offset $-2 \cdot \Delta f$. The sheets or pages can represent a wrap-around a strongest coefficient at origin zero at the third sheet 1303, for example.

The base station and/or the UE (such as the UE 2110 of FIG. 21) can utilize the sheets with their corresponding frequency offsets to construct one or more precoders for signals to be transmitted.

Aspects herein can implement a codebook structure that takes into account TD components for UCI omission in the CSI report. For example, base stations (such as the gNB 2122 of FIG. 21) and/or UEs (such as UE 2110 of FIG. 21) may implement a codebook structure that takes into account a TD component selection for precoding signals exchanged between the base stations and the UEs.

In some embodiments, the codebook structure implemented by the base stations and/or the UEs may be determined based on $W = W_1(\tilde{W}_2 W_d(t,:)^H) W_f^H$ or it can be formulated in another way as $W = W_1(\tilde{W}_2^{\,3} \times W_d(t,:)^H)_2 \times W_f^H$ at spatial layer l. $W_1$ may be a spatial beam selection, $\tilde{W}_2$ may be a non-zero LC coefficient selection and quantization, $W_d$ may be a TD component selection, $$W_d = \left[ f_{k'_0} f_{k'_1} \cdots f_{k'_{M_d-1}} \right],$$

where $\{f_{k'_d}\}_{d=0}^{M_d-1}$ are $M_d$ size-$N_4 \times 1$ orthogonal DFT vectors to select TD components with significant power at a spatial layer, and $W_f^H$ may be the FD component selection, $W_f = [f_{k_0} f_{k_1} \cdots f_{k_{M-1}}]$, where $\{f_{k_m}\}_{m=0}^{M-1}$ are M size-$N_3 \times 1$ orthogonal DFT vectors to select FD components with significant power for sheets at a spatial layer.

Further, P may equal $2N_1N_2$, which may equal a number of SD dimensions. $N_3$ may be equal to a number of FD dimensions. $N_4$ may be equal to a number of time domain dimensions (the maximum number of time units between the CSI report and the predicted precoder for PDSCH in the latest valid time unit).

The base station may determine the precoders for a layer for a UE based on CSI received from the UE. For example, precoders for a layer may be given by size-$P \times N_3$ matrix $W = W_1 \tilde{W}_2 W_f^H$, where $W_1$ is a spatial beam selection, $\tilde{W}_2$ is a bitmap design and quantizer design, and $W_f^H$ is a FD component selection. P may be equal to $2N_1N_2$, which may be equal to a number of spatial domain (SD) dimensions, $N_1$ is the number of antenna ports in one dimension and $N_2$ is the number of antenna ports in another dimension. $N_3$ may be equal to a number of FD dimensions. Precoder normalization may be applied, where the precoder normalization may be defined by the precoding matrix for given rank and unit of $N_3$ is normalized to norm 1/sqrt(rank), where sqrt (rank) is the square root of a rank indicator.

SD selection/compression/quantization may be applied. L spatial domain basis vectors common for both polarizations (mapped to the two polarizations, so 2L spatial beams for both polarizations in total) may be selected. Compression/quantization in spatial domain using $$W_1 = \begin{bmatrix} v_0 v_1 \cdots v_{L-1} & 0 \\ 0 & v_0 v_1 \cdots v_{L-1} \end{bmatrix}$$

may be applied to select spatial beams associated with significant power, where $\{V_i\}_{i=0}^{L-1}$ are $N_1N_2 \times 1$ orthogonal DFT vectors.

FD selection/compression/quantization may be applied. Compression via $W_f = [f_{k_0} f_{k_1} \cdots f_{k_{M-1}}]$, where $\{f_{k_m}\}_{m=0}^{M-1}$ are M size-$N_3 \times 1$ orthogonal DFT vectors to select FD components with significant power for a spatial layer. Number of FD-components M may be configurable. L and M may be configured by gNB.

$\tilde{W}_2$ is a 3D matrix of dimensions $2L \times M \times M_d$ for linear combination coefficients. At spatial layer n, $\tilde{W}_2(l,m,d) = C_{l,m,d}$, $0 \leq l \leq 2L-1$, $0 \leq m \leq M-1$, $0 \leq f \leq M_d-1$, where l is the spatial beam index, m is the FD component index (delay tap index), d is the Doppler component index. At sheet d, $0 \leq d \leq M_d-1$, $\tilde{W}_2(:,:,d)$ (in the matlab matrix convention) is a $2L \times M$ matrix. $X^2 \times Y$ is the matrix product along the 2nd dimension of X to Y. $X_3 \times Y$ is the matrix product along the 3rd dimension of X to Y. Hence $(\tilde{W}_2^3 \times W_d(t,:)^H)$ is a matrix of dimension $2L \times M \times 1$. $(\tilde{W}_2^3 \times W_d(t,:)_H)_2 \times W_f^H$ is a matrix of dimension $2L \times N_3 \times 1$ and W is a matrix of dimension $2N_1 N_2 \times N_3 \times 1$, which is the precoder at time t for $N_3$ precoding subbands.

Time-domain (TD) selection/compression/quantization may be applied. Compression via $$W_d = [f'_{k'_0} f'_{k'_1} \cdots f'_{k'_{M_d-1}}],$$

where $\{f'_{k'_m}\}_{m=0}^{M_d-1}$ are $M_d$ size-$N_4 \times 1$ orthogonal DFT vectors may be applied to select FD components with significant power for a spatial layer. Number of TD-components $M_d$ can be configurable. L and M and $M_d$ can be configured by gNB. $W_2$ is a 3D matrix of dimensions $2L \times M \times M_d$ for linear combination coefficients.

On FD compression unit, {PMI subband size=CQI subband size} can be used as the default, along with {PMI subband size=CQI subband size/R} as enhancements to provide finer adaptation to frequency selective fading. The value of R can be fixed to 2, for example. The FD compression unit parameter R can be configured by the gNB or higher-layer signaling.

On the value of M (the number of FD compression units), $$M = \left\lceil p \times \frac{N_3}{R} \right\rceil$$

where $$p \in \left\{\frac{1}{4}, \frac{1}{2}\right\}.$$

The value or M can also be higher-layer configured [via R and p]. Values of $N_3$: For $R \in \{1,2\}$ and $N_{SB}$ (the number of CQI subbands), $N_3 = N_{SB} \times R$, $R \in \{1,2\}$ can also be higher-layer configured.

On TD compression unit, {precoder time unit=slot duration} can be used as the default, along with {precoder time unit=slot duration/$R_d$} as enhancements to provide finer adaptation to time selective fading. The value of $R_d$ can be 2, 3, 4, 7, 14 for example. The TD compression unit parameter $R_d$ can be higher-layer configured. On the value of $M_d$ (the number of TD compression units), $$M_d = \left\lceil p_d \times \frac{N_4}{R_d} \right\rceil$$

where $$p_d \in \left\{\frac{1}{4}, \frac{1}{2}\right\}$$

for example, which limits the overhead allowed for the Time-domain. The value of $M_d$ is higher-layer configured [via $R_d$ and $p_d$].

If the UE generates the quantizer (e.g., the centers of the Voronoi regions), then the quantizer constellations are included in Group 1 or Group 0.

In various aspects, considering the Doppler offset aspect, omission design can be formulated as (TD components with permutation, FD components with permutation, spatial beam, spatial layer), which is suitable for the Doppler composition component design. Because the signaling overhead for the Doppler composition components can be substantial, the UE can iterate over all the "pages" for a given spatial beam and a given FD component at a given spatial layer. Thus, in response to a complete or entire CSI report exceeding a predefined threshold or allocated resources granted for UCI transmission, the UE can configure an omission of UCI or CSI from the UCI transmission based on the iteration.

If iterating over TD components with a permutation, the pages or sheets 1302 thru 1310 can be iterated over for a same spatial beam by being assigned a priority according to the priority function described herein. The same be done for all FD components across time for spatial beams of a spatial layer and sheet. Other designs can be also considered, such as iterating over FD components with permutation first, TD components with permutation next, then a spatial beam, and a spatial layer. Alternatively, or additionally, the iterations can proceed through FD components with permutation, spatial beam, TD components with permutation, and a spatial layer. Alternatively, or additionally, the iterations can proceed through FD components with permutation first, a spatial beam next, then a spatial layer, and finally iterate over TD components with permutation.

The Doppler components/TD components for the LC coefficients of larger amplitude can be considered more important. Because the LC coefficients tend to be around the origin in the power delay profile, a permutation on the FD components can be re-used as follows: (0, $N_3-1$, 1, $N_3-2$, 2, . . . , considering wrap-around/cyclic time shift), the same principle can be applied to the TD components to favor TD components around a zero frequency offset (as a function of wrap-around and cyclic frequency shift) (favoring 0, $N_4-1$, 1, $N_4-2$, 2, . . . ). In various aspects associated with UCI omission and rules for configuring UCI omission, the non-zero LC coefficient associated with layer $\lambda \in \{0, 1, \ldots, RI-1\}$, beam $l \in \{0, 1, \ldots, 2L-1\}$, FD-basis $m \in \{0, 1, \ldots, M-1\}$, and TD-basis $d \in \{0, 1, \ldots, M_d-1\}$ can be denoted or represented as $c_{l,m,d}^{(\lambda)}$. The associated bitmap component (including zero(s)) is $\beta_{l,m}^{(\lambda)}$. For the purpose of UCI omission, the parameters in UCI Part 2 can be divided into 3 groups where Group n is of a higher priority than Group (n+1), n=0, 1. The divisions can be based on priority levels of the parameters according to a priority function. If priority levels of two LCCs $c_{l_1,m_1,d_1}^{(\lambda_1)}$ and $c_{l_2,m_2,d_2}^{(\lambda_2)}$ are such that $Prio(\lambda_2,l_2,m_2,d_2) < Prio(\lambda_1,l_1,m_1,d_1)$, LCC $c_{l_2,m_2,d_2}^{(\lambda_2)}$ has a higher priority over $c_{l_1,m_1,d_1}^{(\lambda_1)}$. The Non-zero LC coefficients $c_{l,m,d}^{(\lambda)}$, bits of bitmap $\beta_{l,m}^{(\lambda)}$, and bits of Doppler component composition are prioritized/ordered from high to low priority according to ($\lambda$, l, m, d) with the same priority function $Prio(\lambda, l, m, d)$. For generating bits of the bitmap, d=0 can be assumed. The priority level is calculated according to the following representation: $Prio(\lambda,l,m,d) = N_3 \cdot 2L \cdot RI \cdot P_d(d) + 2L \cdot RI \cdot P(m) + RI \cdot l + \lambda$ where $P(m)$ maps the index m according to the following order of the corresponding FD components (if selected): 0, $N_3-1$, 1, $N_3-2$, 2, . . . , etc., iteratively away from an origin according to a wrap-around and cyclic shift, but is not necessarily limited to such. $P_d(d)$ maps the index d according to the following order of the corresponding TD components (if selected): 0, $N_4-1$, 1, $N_4-2$, 2, . . . , etc., iteratively away from an origin according to a wrap-around and cyclic shift, but is not necessarily limited to such.

When the UE is configured to report $N_{Rep}$ CSI reports, Group 0 can include, but not necessarily limited to, one or more of the following parameters: SD rotation factors, an SD indicator, and one or more SCI(s) for all the $N_{Rep}$ reports, for example. For each of the $N_{Rep}$ reports, Group 1 can include, but not necessarily limited to, one or more of the following parameters: reference amplitude(s) for weaker polarization, FD indicator, TD indicator, the $\lceil K_{NZ}^{TOT}/2 \rceil$ highest priority non-zero LC coefficients $c_{l,m,d}^{(\lambda)}(\{c_{l,m,d}^{(\lambda)}, (\lambda,l,m,d) \in G_1\})$ and the RI·2LM−$\lfloor K_{NZ}^{TOT}/2 \rfloor$ highest priority bits of bitmap $\beta_{l,m}^{(\lambda)}$, and $\lceil$# of bits for Doppler component composition/2$\rceil$ of the highest Doppler component composition bits. For each of the $N_{Rep}$ reports, Group 2 can include, but not necessarily limited to, one or more of the following parameters: the $\lfloor K_{NZ}^{TOT}/2 \rfloor$ lowest priority non-zero LC coefficients $c_{l,m}^{(\lambda)}(\{c_{l,m,d}^{(\lambda)}, (\lambda,l,m,d) \in G_2\})$ and the $\lfloor K_{NZ}^{TOT}/2 \rfloor$ lowest priority bits of bitmap $\beta_{l,m}^{(\lambda)}$, $\lfloor$# of bits for Doppler component composition/2$\rfloor$ of the lowest Doppler component composition bits. $G_1$ and $G_2$ can be configured to exclude the indices associated with the strongest coefficient(s). The Doppler components for the LC coefficients of larger amplitude are more important. Since the LC coefficients tend to be around the origin (0, $N_3$−1, 1, $N_3$−2, 2, . . . , considering wrap-around), the same design principle can be applied to the TD components (favoring 0, $N_4$−1, 1, $N_4$−2, 2, . . . ).

Other types of metrics, such as, for example, a scaled Euclidean distance to the origin (m=0, d=0) in the form P(m,d)=sqrt(|m^2+d^2|), or P(m,d)=(m^2+d^2) can be used. P(m,d) can be also formulated as P(r1{m},r2{d}) with the previous function, r1{m}=min(m, abs(m−N3)), r2(d)=min (d, abs(d−N4)), and the priority function can be represented by: Prio($\lambda$,l,m,d)=$N_3$·2L·RI·P(m,d)+2L·RI·P(m)+RI·I+$\lambda$.

Figure 14:
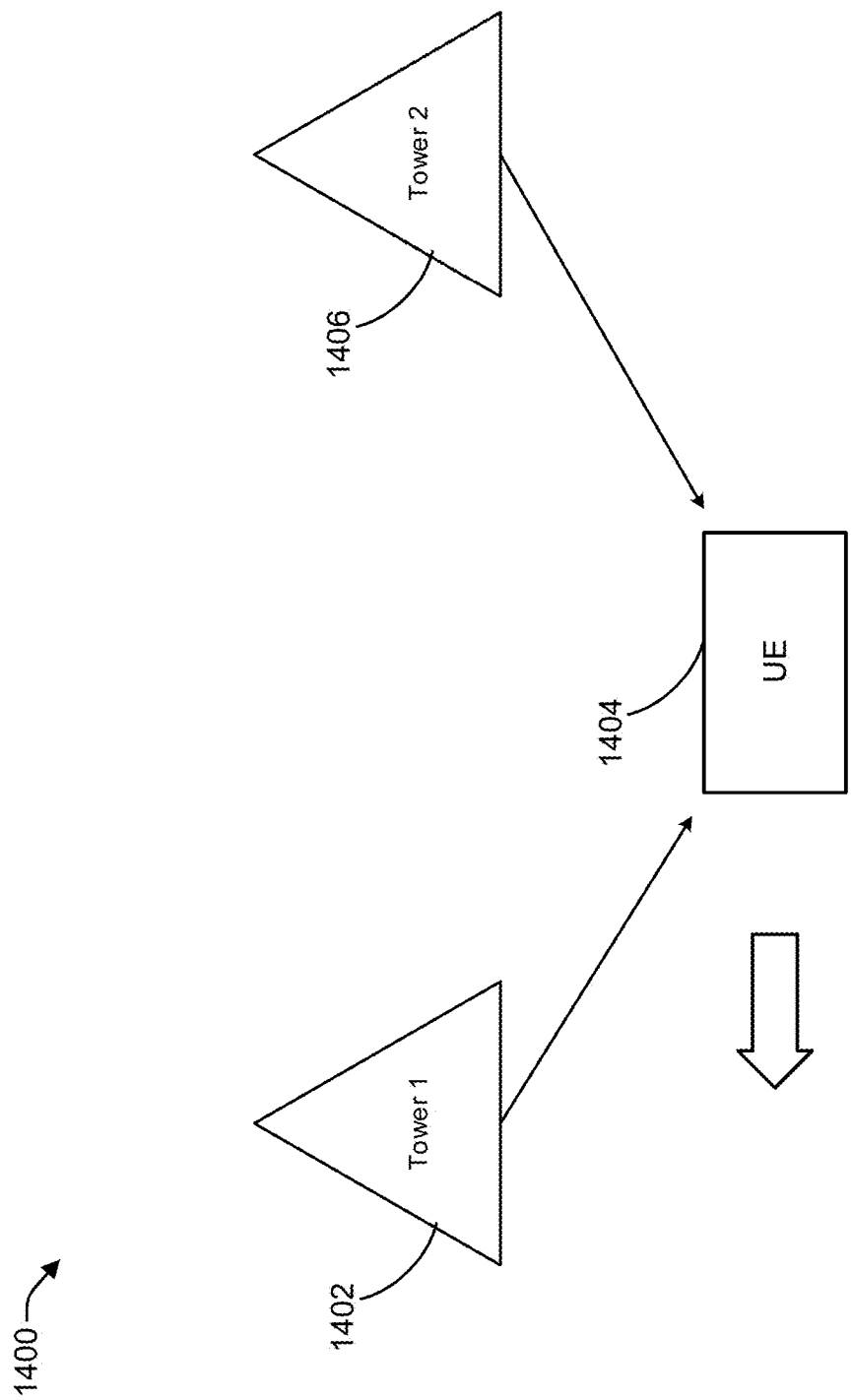
FIG. 14 illustrates an example high speed scenario between different communication paths in accordance with various embodiments.

FIG. 14 illustrates an example of a high speed train scenario in which UE 1404 transitions between two base stations 1402 and 1406 (or gNBs) as towers 1 and 2. The UE 1404 is moving on a rail line towards base station 1402 and away from base station 1406, which induces two different FD components or taps with different frequency offsets and different time offsets. The doppler frequency can be very different between the two paths between each tower and the UE 1404 as well as the time delay. For frequency offset there can be essentially two different signal spikes giving two strong coefficients that are very different frequency. Even after normalization of the coefficients, the strong coefficient is relocated basically either on this side of a zero neighbored as a right neighborhood or left neighborhood.

Figure 15:
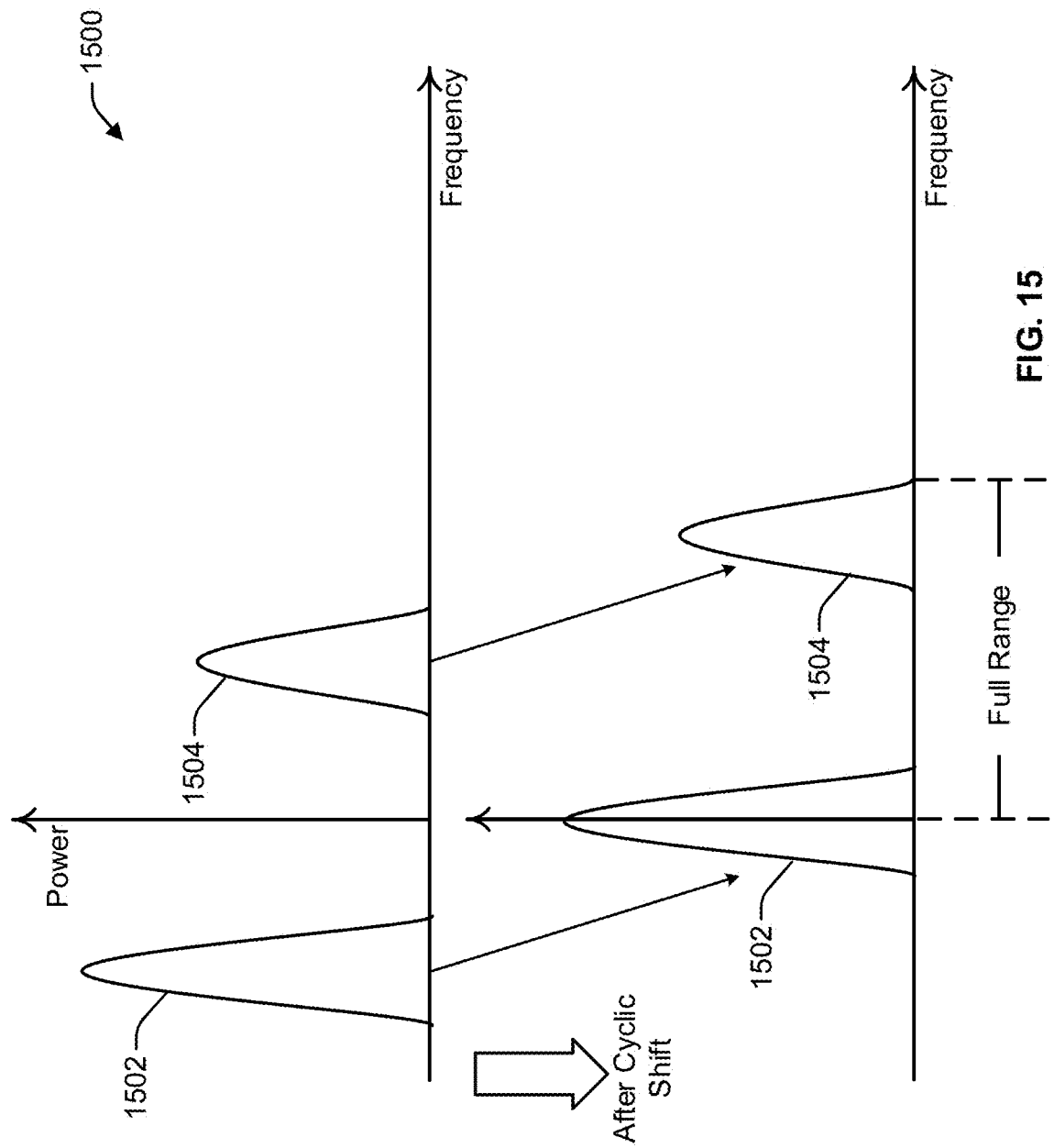
FIG. 15 illustrates an example of a cyclic shift of TD components in the high speed scenario in accordance with various embodiments.
Figure 16:
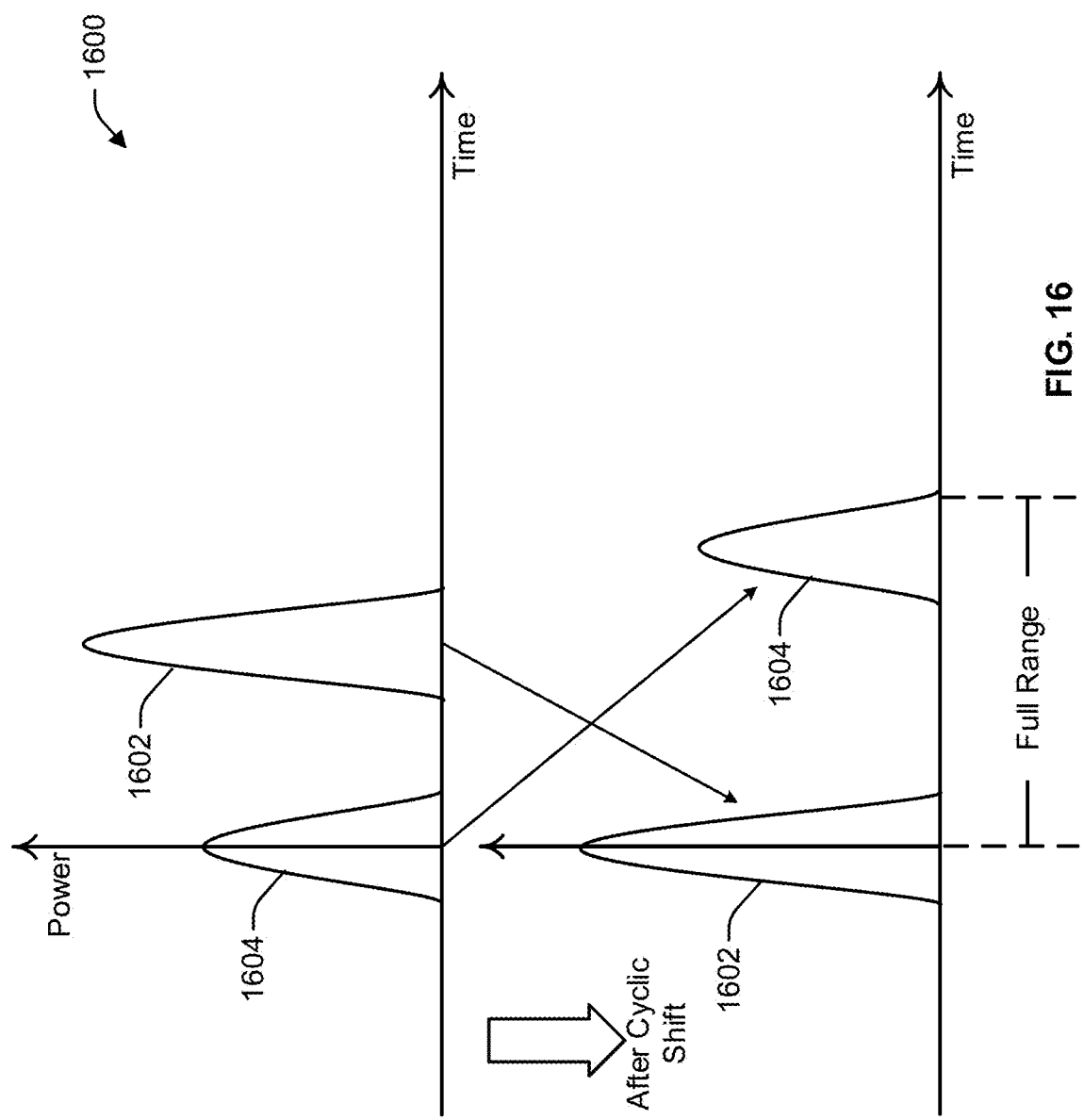
FIG. 16 illustrates an example of a cyclic shift of FD components in the high speed scenario in accordance with various embodiments.

As illustrated in FIGS. 15 and 16, signal spikes for the high speed train scenario 1400 result in power spike profiles 1502 and 1504 along the frequency domain and power spike profiles 1602 and 1604 in the time domain. The one spike 1502 and 1602 is not in a same neighborhood as the other spike 1504 or 1604. Once both spikes are normalized based on the strongest coefficient relative to a frequency offset and relative delay, respectively, such that the strongest coefficient associated with the strongest power spike profile 1502 and 1602 are zeroed relative to all other spikes, the profiles are cyclically shifted. Afterwards, then the UE 1404 can determine whether there is still a coefficient with a significant frequency offset or a significant relative delay relative to another base station. As discussed above, the UE 1404 can still perform a read out sequence of all the coefficients across FD components with permutation, FD components with permutation, spatial beam(s), and spatial layers(s) in one or more different orders for iteration of all sheets by going from right to left neighborhoods around the strongest coefficient origin. However, the UE could still be missing information associated with another significant spike as a result of limited resources being granted for UCI transmission of the CSI report.

Thus, the UE 1404 can configure an alternative permutation of the TD and FD components for a read out of the parameters associated with the priority function. Then the UE can suggest a frequency offset order/permutation, instead of using $N_4$−1, 1, $N_4$−2, 2, . . . , and delay tap order/permutation instead of 0, $N_3$−1, 1, $N_3$−2, 2, . . . , etc.

In an aspect, the UE 1404 can configure the CSI report to report the location of clusters including the strongest spike 1602 along with its neighbors. The strongest cluster 1502 and 1602 can be centered around FD component zero and TD component zero, for example, and the other cluster around the other significant spike profile 1504 and 1604 can be identified by its corresponding FD component index and TD component index. The spike locations and their neighbors can be reported, while the strongest 1502 and 1602 would not be reported because it is around FD component 0 and TD component 0 from normalization of the spike.

Figure 17:
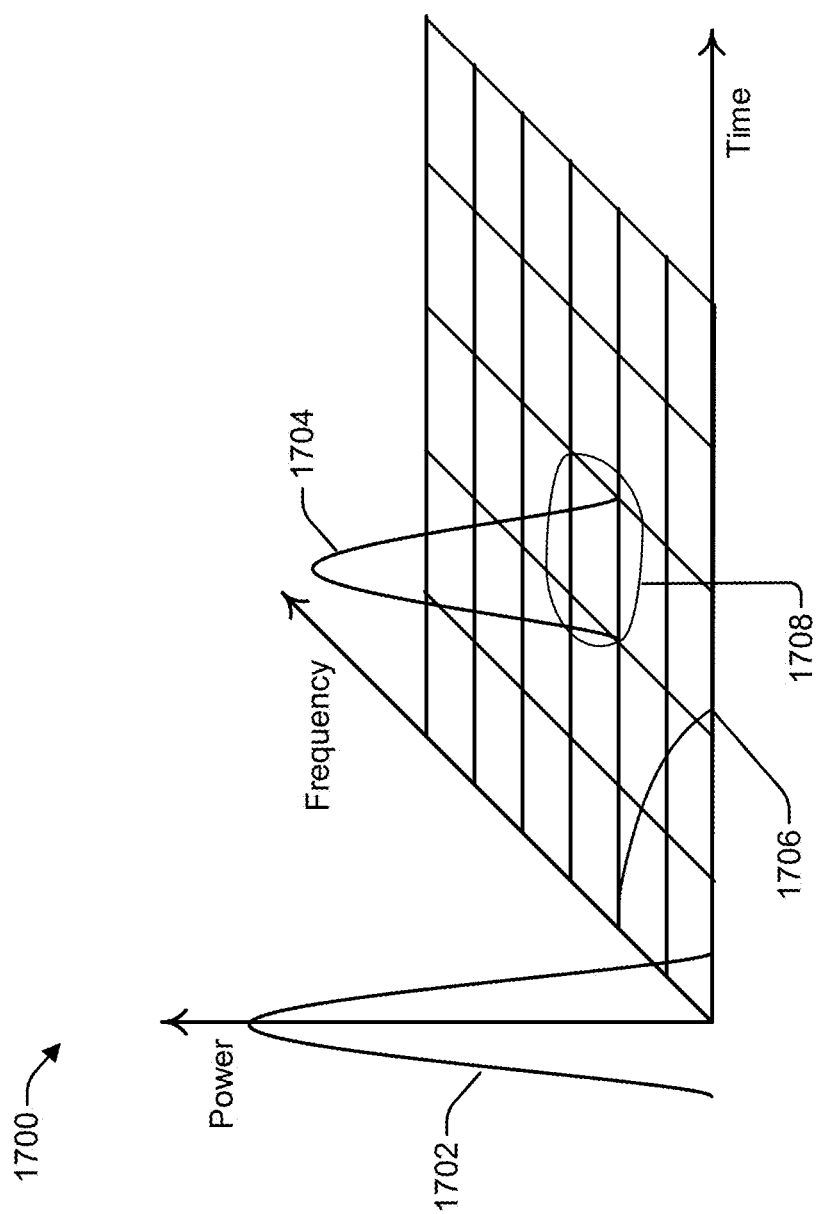
FIG. 17 illustrates an example of profile spikes with neighborhoods in the high speed scenario between different communication paths in accordance with various embodiments.

Referring to FIG. 17, illustrated is an example of the two power profile spikes of FIGS. 15 and 16, associated with strongest and next strongest power profile spikes 1502, 1602 and 1504, 1604, at spike 1702 and 1704, respectively. Two spikes 1702 and 1704 representing the strongest and next strongest coefficients are illustrated in a 3D axis along power, delay and frequency offset. Spike 1702 comprises a coefficient neighborhood 1706 and spike 1704 comprises a coefficient neighborhood 1708, in which can be from leakage of each signal path represented at neighborhood 1706 and neighborhood 1708 and may include weaker related peaks.

The UE 1404 can be configured to read out, for example, two spikes 1702 and 1704 in the Doppler offsets (e.g. one at 0, another at $\hat{f}$), then the mapping order or read out order can be 0, $\hat{f}$, $N_4$−1, $\hat{f}$+1, 1, $\hat{f}$−1, . . . etc. by utilizing iterations of a wrap-around sequence between the two neighborhoods 1706 and 1708 and their associated peaks 1702 and 1704, respectively. In other words, positions around 0 and positions around f can be chosen at alternate order, and the UE could be configured to jump at alternate orders with pairs of position 0's neighbors and position $\hat{f}$'s neighbors, e.g. 0, $N_4$−1, 1, $\hat{f}$, $\hat{f}$+1, $\hat{f}$−1, $N_4$−2, 2, . . . etc. The neighborhoods of multiple spikes (TD components) can thus be iterated alternatively. For each visit of the neighborhood of a spike, the left one (not picked yet), the right one (not picked yet), or both the left one and right one (not picket yet) can be picked for read out and evaluation of priority for the CSI report in a UCI transmission. The neighborhoods of each spike can be considered clusters or areas of cluster around significant peaks of value from different signal paths. Thus, reporting on one cluster with normalization of all coefficients can be reported to give parameters that indicate the direction of the other peak with another cluster and allow the base station to locate beams with the UE 1404 that are not in close proximity necessarily. Similarly, the same process and consideration can be applied to the FD components, from the high speed train scenario, so the neighborhoods of multiple spikes (FD components) are iterated alternatively and when cyclically shifted for read out and selection for omission. This can provide an opportunity to prioritize clusters in neighborhoods of peaks and eliminate other neighbors in the area, especially when limited resources are constrained, but still retain enough information to generate beams based on key parameters associated with stronger coefficients that otherwise may be missed or not reported.

In an aspect, a power difference or estimated potential power difference between two spikes can be considered in determining a stop condition for the read out sequence for selectively reporting on information while omitting other CSI. The stop condition can be defined to stop the iterations among neighborhoods of two or more spikes, until a given or predefined number of neighbors of a second spike have been picked up or selected. Then the selection of CSI can stop based on the second spike.

Figure 18:
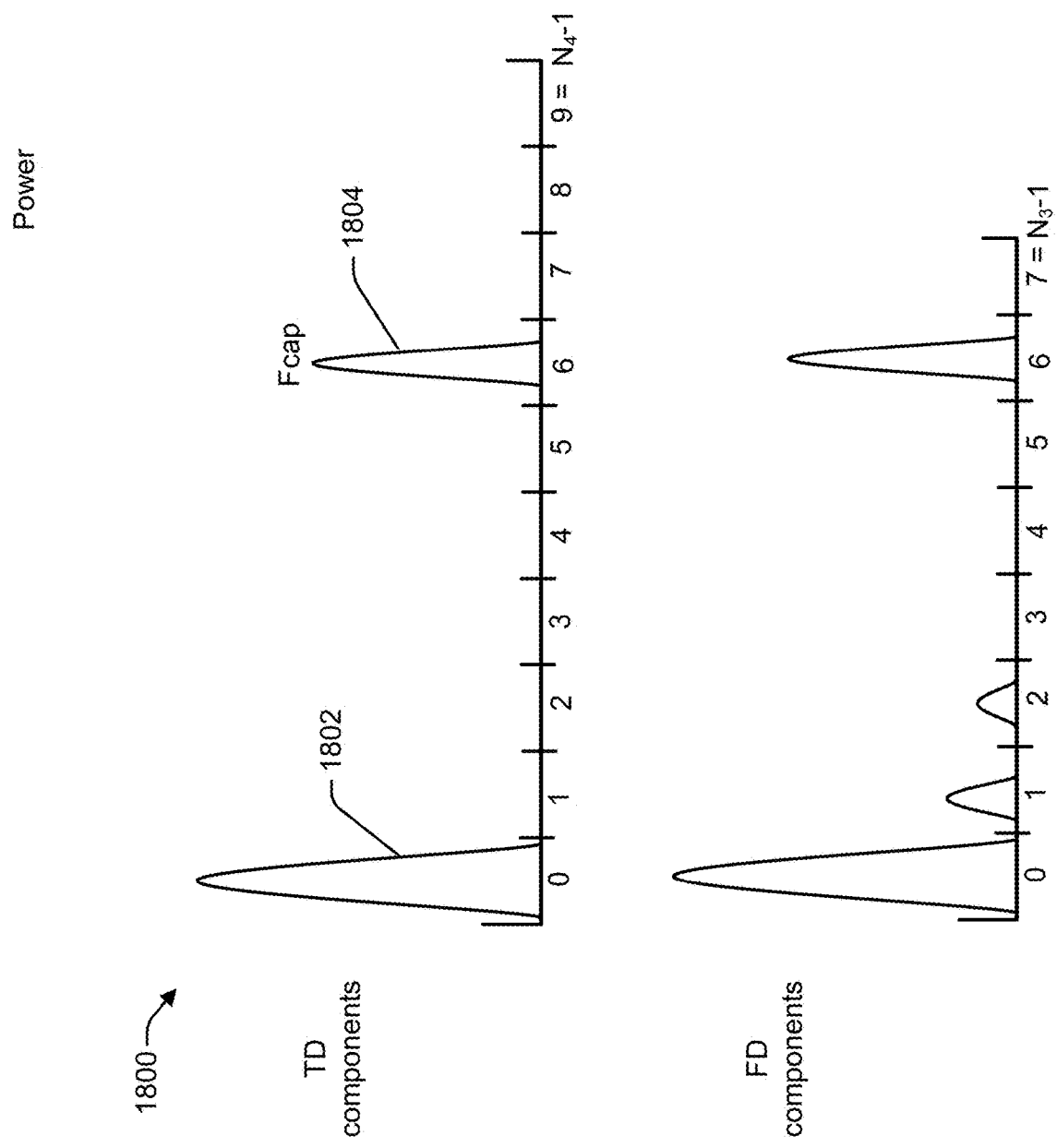
FIG. 18 illustrates an example of read out sequence in accordance with various embodiments.

FIG. 18 illustrates an example for reporting cluster locations around significant spikes for TD components and FD components. The UE can identify and report positions around 0 and positions around $\hat{f}$ can be chosen in an alternate order, for example, according to the aspects described herein. The UE could be configured to jump in alternate orders with pairs of position 0's neighbors and position $\hat{f}$'s neighbors, e.g., 0, $N_4-1$, 1, $\hat{f}$, $\hat{f}+1$, $\hat{f}-1$, $N_4-2$, 2, ... etc.

In the illustrated example, 10 TD components (see page 13) are spanned along a permutation from 0 to 9, with $N_4$ being the number of time dimensions (the maximum time units between CSI report and a predicted precoder for PDSCH in the latest valid time unit. As illustrated, a strongest coefficient is at the origin zero. The UE can also determine or obtain indication of a reference location for a second cluster at 6, indicated as $\hat{f}$. A read out sequence can proceed with one cluster first, while reading out or excluding zero as a strongest one after normalization. Then move to the other cluster and similarly read out neighbors of each cluster. Then return to the left neighborhood and read out 2, for example. The two clusters can be read out back and forth to obtain clusters of neighbors around each one. The clusters can then be reported in multiple ways in order to iterate between two different clusters over different neighbors of each cluster. In one example, a read out could iterate as follows: 0, 4, 8, 9, 7, 3, 1, 3, 6, 2. With the strongest of each iteration across the two neighborhoods of a cluster being read out and iteratively sequencing between each neighborhood of each cluster. The UE thus can report clusters by indicating the indices of neighbors for each, giving an indication of a direction of a second neighbor, for example. By indicating the location of a very substantial coefficient, even though it is not in the neighborhood of the coefficients on the left hand, the UE can give indication of it without an explicit indication and can develop a more effective read out mechanism with limited resources or constraints in UCI omission for the CSI report.

There is a similarity between TD components and FD components for iteratively reading out the coefficients. Here, the UE can consider the FD components by reading out one as zero and one, and the left neighbor as 2. The read out can include 0, 4 and then 3, 1 and then 2, for example. Various iteration sequences can be envisioned for omitting UCI Part 2 for TD and FD components. The UE can read out one zero, 1, then the left neighbor 2 when iterating from the other cluster around 5. This amplitude is smaller than the power concentrated in the neighborhood of 5. After exhausting two clusters, more can be considered based on the amount of resources for the CSI report. Similarly with the TD components, the UE can consider giving a read out of cluster locations by reporting the strongest coefficient and the indices of another cluster giving its direction. The read out can include 0, 4 and then 3, 1 and then 2, for example. Various iteration sequences can be envisioned for omitting UCI Part 2 for TD and FD components.

The UE can be constrained on resources and generate various constrains on omitting and stopping read out sequences. If the UE reported the location of another cluster by FD component index and TD component index, there could be an indication of a cluster on a particular page or sheet of one or more FD components that are strong with a dependency of its neighborhood to be strong. The frequency offset of one of the neighborhoods in this direction could also be strong. Thus, by indicating the location of a very substantial coefficient, but it is not in the neighborhood of the strongest coefficient on the left hand, then the UE can indicate it without an explicit indication with FD component and TD component indices.

Figure 19:
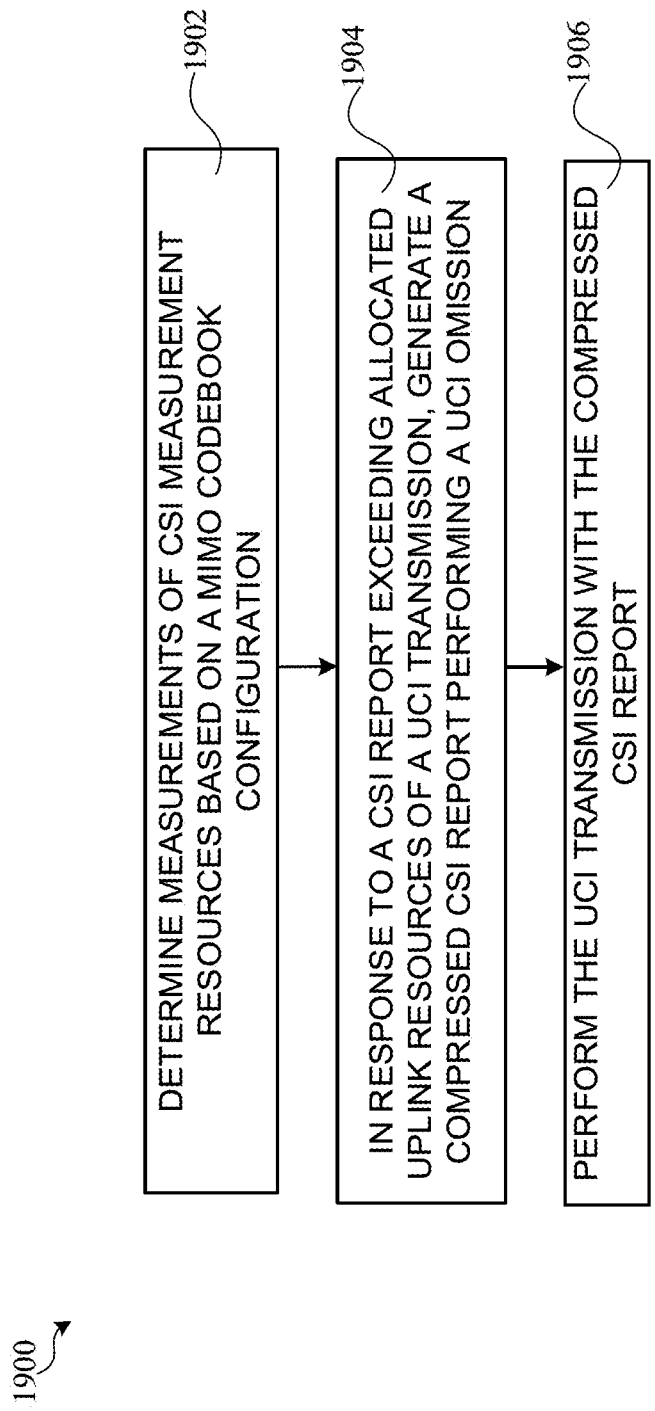
FIGS. 19 and 20 illustrate example process flows for UCI omission in accordance with various embodiments.

Referring to FIG. 19, illustrated is an example process flow 1900 for generating a CSI report with an UCI omission in accord with various aspects. The Process flow 1900 can initiate at 1902 with determining measurements of CSI measurement resources (e.g., CSI-reference signal (CSI-RS)) based on a multiple-input, multiple-output (MIMO) codebook configuration. At 1904, in response to a CSI report exceeding allocated uplink resources of a UCI transmission, generate a compressed CSI report by performing UCI omission to omit parameters or measurements of the CSI report based on components comprising frequency domain (FD) components and time domain (TD) components. At 1906, the UCI transmission can be performed (e.g., via the UE 2110 of FIG. 21) with the compressed CSI report such as in a physical uplink channel.

In aspect, the process flow can further comprise determining a priority level of parameters of linear combination (LC) coefficients $c_{l,m,d}^{(\lambda)}$ for a UCI part 2 of the CSI report including the FD components and the TD components according to a priority level definition comprising: $Prio(\lambda, l,m,d)=N_3 \cdot 2L \cdot RI \cdot P_d(d)+2L \cdot RI \cdot P(m)+RI \cdot I+\lambda$ where $P(m)$ maps an index m according to a following order of the FD components: 0, $N_3-1$, 1, $N_3-2$, 2, ..., and $P_d(d)$ maps the index d according to a following order of the TD components: 0, $N_4-1$, 1, $N_4-2$, 2, ..., where spatial layer $\lambda\{0, 1, ..., $ rank indicator (RI)$-1\}$, spatial beam $l\in-\{0, 1, ..., 2L-1\}$, FD-component basis $m\in\{0, 1, ..., M-1\}$, and TD-component basis $d\in\{0, 1, ..., M_d-1\}$, where $N_3$ may be equal to a number of FD dimensions. $N_4$ may be equal to a number of time domain dimensions (the maximum number of time units between the CSI report and the predicted precoder for PDSCH in the latest valid time unit).

In aspect, the process flow can further comprise determining a priority level of parameters of linear combination (LC) coefficients $c_{l,m,d}^{(\lambda)}$ for a UCI part 2 of the CSI report including the FD components and the TD components according to a priority level definition comprising: $Prio(\lambda, l,m,d)=N_4 \cdot 2L \cdot RI \cdot P(m)+2L \cdot RI \cdot P_d(d)+RI \cdot I+\lambda$ where $P(m)$ maps an index m according to a following order of the FD components: 0, $N_3-1$, 1, $N_3-2$, 2, ..., and $P_d(d)$ maps the index d according to a following order of the TD components: 0, $N_4-1$, 1, $N_4-2$, 2, ..., where spatial layer $\lambda\{0, 1, ..., $ rank indicator (RI)$-1\}$, spatial beam $l\in-\{0, 1, ..., 2L-1\}$, FD-component basis $m\in\{0, 1, ..., M-1\}$, and TD-component basis $d\in\{0, 1, ..., M_d-1\}$, where $N_3$ may be equal to a number of FD dimensions. $N_4$ may be equal to a number of time domain dimensions (the maximum number of time units between the CSI report and the predicted precoder for PDSCH in the latest valid time unit).

In an aspect, the process flow 1900 can further comprise iteratively reading out neighbor components to a strongest FD component and a strongest TD component in a wrap-around procedure, and selecting the neighbor components to include in the CSI report by normalizing the strongest FD component and a strongest TD component at an origin and performing a cyclic shift.

In an aspect, the process flow 1900 can further comprise: determining clusters of neighborhood components to strongest components from the FD components and the TD components among a plurality of pages associated with different frequency offsets for a spatial layer, reading out the clusters of neighborhood components in a wrap-around procedure and a cyclic shift of the strongest components, and selecting the clusters to report in the CSI report based on one or more indices of a second strongest component and neighbor components of a first strongest component.

In an aspect, the selection of parameters or measurements to omit from a portion of UCI part 2 information comprising a lowest priority from among a plurality of portions of UCI part 2 information can be based on a priority function applied to each of the FD components and the TD components.

In other aspects, the process flow 1900 can include reading out parameters of the FD components and the TD components from among a plurality of sheets based on a sequence order by iteratively identifying the FD components, the TD components, spatial beam(s), and spatial layer(s), wherein the sequence order for an iteration comprises FD components first, TD components second, a spatial beam third and a spatial layer fourth, or any order of iterating through the FD components, the TD components, spatial beam(s), and spatial layer(s) at a time in a sequence.

The process flow can further include mapping TD components in a wrap-around procedure from a strongest TD component that is cyclically shifted to a zero origin; and mapping FD components in the wrap-around procedure from a strongest FD component that is cyclically shifted to the zero origin; identifying from among the TD components and the FD components in at least one cluster within a different coefficient neighborhood than a coefficient neighborhood of the strongest TD component and the strongest FD component; reading out pairs of indices of the TD components and the FD components within the coefficient neighborhood and the different coefficient neighborhood in an alternating sequence to one another; and reporting the at least one cluster based on one or more indices within the coefficient neighborhood and the different coefficient neighborhood.

Figure 20:
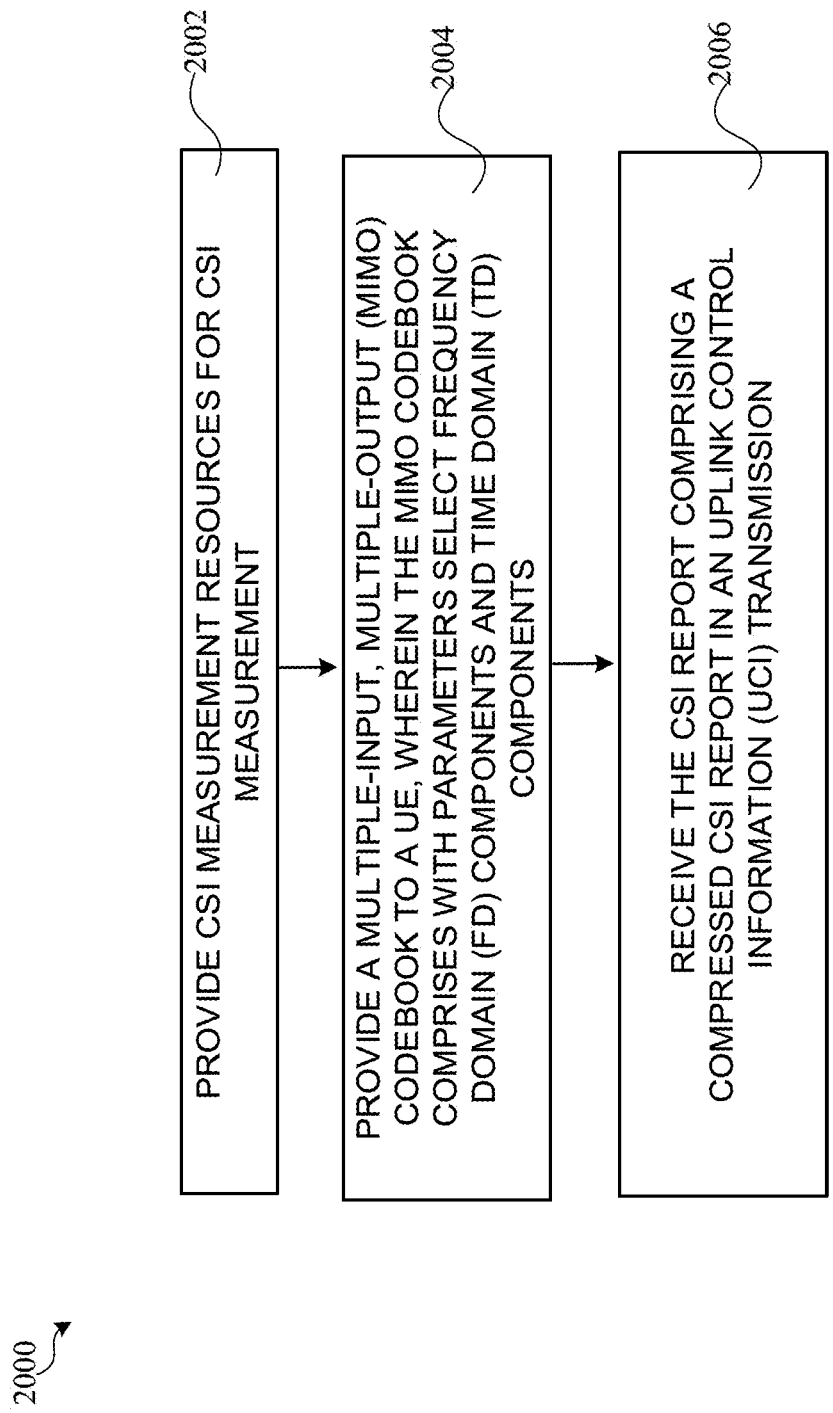
Figure 21:
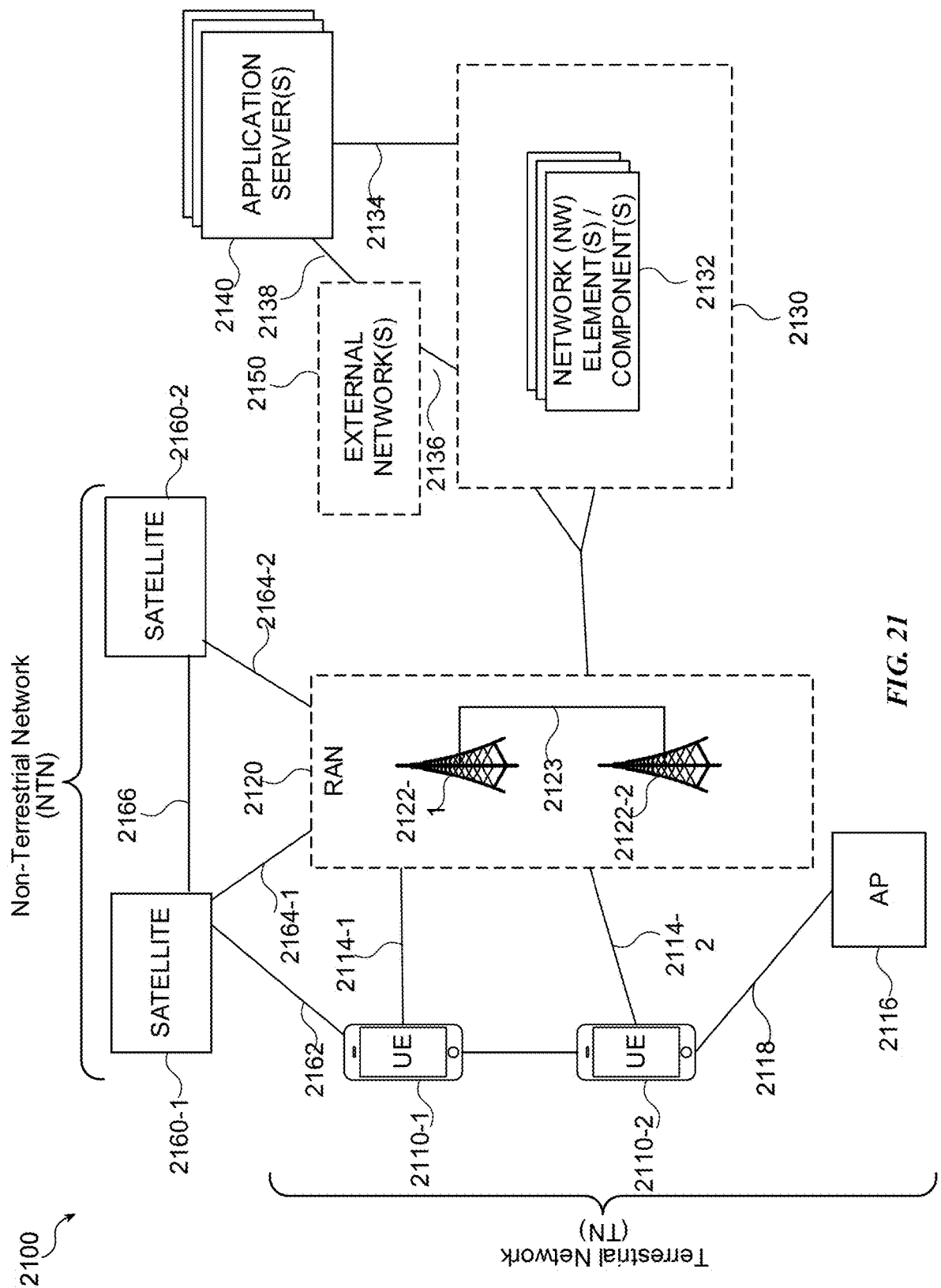
FIG. 21 is a diagram of an example of components of a device according to one or more implementations described herein.

Referring to FIG. 20, illustrated is an example process flow 2000 for processing a CSI report, such as by a base station (such as gNB 2120 of FIG. 21). The process flow 2000 initiates at 2002 with providing CSI measurement resources for CSI measurement. At 2004, the process flow 2000 includes providing a multiple-input, multiple-output (MIMO) codebook to a UE, wherein the MIMO codebook comprises with parameters select frequency domain (FD) components and time domain (TD) components. At 2006, the process flow 2000 receiving the CSI report comprising a compressed CSI report in an uplink control information (UCI) transmission.

In an aspect, the process flow 2000 can further include generating, by the base station, one or more precoders based on the CSI report, wherein the CSI report comprises an indication of coefficients around different clusters in different neighborhoods from among a plurality of pages associated with a spatial layer, omitting a strongest component and components with a lower priority based on a priority function.

In an aspect, the process flow 2000 can further include generating a precoder for symbols associated with a first coefficient cluster of a first neighborhood and a second coefficient cluster in a second neighborhood based on the CSI report.

In an aspect, the process flow 2000 can further include receiving UCI part 2 with parameters associated with a portion of the UCI part 2 based on a priority function.

FIG. 21 is an example network 2100 according to one or more implementations described herein. Example network 2100 may include UEs 2110-1, 2110-2, etc. (referred to collectively as "UEs 2110" and individually as "UE 2110"), a radio access network (RAN) 2120, a core network (CN) 2130, application servers 2140, external networks 2150, and satellites 2160-1, 2160-2, etc. (referred to collectively as "satellites 2160" and individually as "satellite 2160"). As shown, network 2100 may include a non-terrestrial network (NTN) comprising one or more satellites 2160 (e.g., of a global navigation satellite system (GNSS)) in communication with UEs 2110 and RAN 2120.

The systems and devices of example network 2100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 2100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 2110 may include smartphones (e.g., handheld touchscreen mobile computing devices connectable to one or more wireless communication networks). Additionally, or alternatively, UEs 2110 may include other types of mobile or non-mobile computing devices capable of wireless communications, such as personal data assistants (PDAs), pagers, laptop computers, desktop computers, wireless handsets, etc. In some implementations, UEs 2110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 2110 may communicate and establish a connection with (e.g., be communicatively coupled) with RAN 2120, which may involve one or more wireless channels 2114-1 and 2114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 2122-1 and 2122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 2130. Additionally, at least one of the MN or the SN may be operated with shared spectrum channel access, and functions specified for UE 2110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network nod 2122.

As shown, UE 2110 may also, or alternatively, connect to access point (AP) 2116 via connection interface 2118, which may include an air interface enabling UE 2110 to communicatively couple with AP 2116. AP 2116 may comprise a wireless local area network (WLAN), WLAN node, WLAN termination point, etc. The connection 21207 may comprise a local wireless connection, such as a connection consistent with any IEEE 702.11 protocol, and AP 2116 may comprise a wireless fidelity (Wi-Fi®) router or other AP. While not explicitly depicted, AP 2116 may be connected to another network (e.g., the Internet) without connecting to RAN 2120 or CN 2130. In some scenarios, UE 2110, RAN 2120, and AP 2116 may be configured to utilize LTE-WLAN aggregation (LWA) techniques or LTE WLAN radio level integration with IPsec tunnel (LWIP) techniques. LWA may involve UE 2110 in RRC_CONNECTED being configured by RAN 2120 to utilize radio resources of LTE and WLAN. LWIP may involve UE 2110 using WLAN radio resources (e.g., connection interface 2118) via IPsec protocol tunneling to authenticate and encrypt packets (e.g., Internet Protocol (IP) packets) communicated via connection interface 2118. IPsec tunneling may include encapsulating the entirety of original IP packets and adding a new packet header, thereby protecting the original header of the IP packets.

RAN 2120 may include one or more RAN nodes 2122-1 and 2122-2 (referred to collectively as RAN nodes 2122, and individually as RAN node 2122) that enable channels 2114-1 and 2114-2 to be established between UEs 2110 and RAN 2120. RAN nodes 2122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 2122 may include a roadside unit (RSU), a transmission reception point (TRxP or TRP), and one or more other types of ground stations (e.g., terrestrial access points). In some scenarios, RAN node 2122 may be a dedicated physical device, such as a macrocell base station, and/or a low power (LP) base station for providing femtocells, picocells or other like having smaller coverage areas, smaller user capacity, or higher bandwidth compared to macrocells. As described below, in some implementations, satellites 2160 may operate as base stations (e.g., RAN nodes 2122) with respect to UEs 2110. As such, references herein to a base station, RAN node 2122, etc., may involve implementations where the base station, RAN node 2122, etc., is a terrestrial network node and also to implementation where the base station, RAN node 2122, etc., is a non-terrestrial network node (e.g., satellite 2160).

Some or all of RAN nodes 2122 may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 2122; a media access control (MAC)/physical (PHY) layer split wherein RRC, PDCP, radio link control (RLC), and MAC layers may be operated by the CRAN/vBBUP and the PHY layer may be operated by individual RAN nodes 2122; or a "lower PHY" split wherein RRC, PDCP, RLC, MAC layers and upper portions of the PHY layer may be operated by the CRAN/vBBUP and lower portions of the PHY layer may be operated by individual RAN nodes 2122. This virtualized framework may allow freed-up processor cores of RAN nodes 2122 to perform or execute other virtualized applications.

In some implementations, an individual RAN node 2122 may represent individual gNB-distributed units (DUs) connected to a gNB-control unit (CU) via individual F1 interfaces. In such implementations, the gNB-DUs may include one or more remote radio heads or radio frequency (RF) front end modules (RFEMs), and the gNB-CU may be operated by a server (not shown) located in RAN 2120 or by a server pool (e.g., a group of servers configured to share resources) in a similar manner as the CRAN/vBBUP. Additionally, or alternatively, one or more of RAN nodes 2122 may be next generation eNBs (i.e., gNBs) that may provide evolved universal terrestrial radio access (E-UTRA) user plane and control plane protocol terminations toward UEs 2110, and that may be connected to a 5G core network (5GC) 2130 via an NG interface.

Any of the RAN nodes 2122 may terminate an air interface protocol and may be the first point of contact for UEs 2110. In some implementations, any of the RAN nodes 2122 may fulfill various logical functions for the RAN 2120 including, but not limited to, radio network controller (RNC) functions such as radio bearer management, uplink and downlink dynamic radio resource management and data packet scheduling, and mobility management. UEs 2110 may be configured to communicate using orthogonal frequency-division multiplexing (OFDM) communication signals with each other or with any of the RAN nodes 2122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 2122 to UEs 2110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 2122 may be configured to wirelessly communicate with UEs 2110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 2110 and the RAN nodes 2122 may operate using licensed assisted access (LAA), eLAA, and/or feLAA mechanisms. In these implementations, UEs 2110 and the RAN nodes 2122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL, and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 2110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH may carry user data and higher layer signaling to UEs 2110. The physical downlink control channel (PDCCH) may carry information about the transport format and resource allocations related to the PDSCH channel, among other things. The PDCCH may also inform UEs 2110 about the transport format, resource allocation, and hybrid automatic repeat request (HARQ) information related to the uplink shared channel. Typically, downlink scheduling (e.g., assigning control and shared channel resource blocks to UE 2110-2 within a cell) may be performed at any of the RAN nodes 2122 based on channel quality information fed back from any of UEs 2110. The downlink resource assignment information may be sent on the PDCCH used for (e.g., assigned to) each of UEs 2110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 2122 may be configured to communicate with one another via interface 2123. In implementations where the system is an LTE system, interface 2123 may be an X2 interface. The X2 interface may be defined between two or more RAN nodes 2122 (e.g., two or more eNBs/gNBs or a combination thereof) that connect to evolved packet core (EPC) or CN 2130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 2110 from an SeNB for user data; information of PDCP PDUs that were not delivered to a UE 2110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 2120 may be connected (e.g., communicatively coupled) to CN 2130. CN 2130 may comprise a plurality of network elements 2132, which are configured to offer various data and telecommunications services to customers/subscribers (e.g., users of UEs 2110) who are connected to the CN 2130 via the RAN 2120. In some implementations, CN 2130 may include an evolved packet core (EPC), a 5G CN, and/or one or more additional or alternative types of CNs. The components of the CN 2130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 2130 may be referred to as a network slice, and a logical instantiation of a portion of the CN 2130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 2130, application servers 2140, and external networks 2150 may be connected to one another via interfaces 2134, 2136, and 138, which may include IP network interfaces. Application servers 2140 may include one or more server devices or network elements (e.g., virtual network functions (VNFs) offering applications that use IP bearer resources with CN 2130 (e.g., universal mobile telecommunications system packet services (UMTS PS) domain, LTE PS data services, etc.). Application servers 2140 may also, or alternatively, be configured to support one or more communication services (e.g., voice over IP (VOIP) sessions, push-to-talk (PTT) sessions, group communication sessions, social networking services, etc.) for UEs 2110 via the CN 2130. Similarly, external networks 2150 may include one or more of a variety of networks, including the Internet, thereby providing the mobile communication network and UEs 2110 of the network access to a variety of additional services, information, interconnectivity, and other network features.

As shown, example network 2100 may include an NTN that may comprise one or more satellites 2160-1 and 2160-2 (collectively, "satellites 2160"). Satellites 2160 may be in communication with UEs 2110 via service link or wireless interface 2162 and/or RAN 2120 via feeder links or wireless interfaces 2164 (depicted individually as 2164-1 and 2164). In some implementations, satellite 2160 may operate as a passive or transparent network relay node regarding communications between UE 2110 and the terrestrial network (e.g., RAN 2120). In some implementations, satellite 2160 may operate as an active or regenerative network node such that satellite 2160 may operate as a base station to UEs 2110 (e.g., as a gNB of RAN 2120) regarding communications between UE 2110 and RAN 2120. In some implementations, satellites 2160 may communicate with one another via a direct wireless interface (e.g., 2166) or an indirect wireless interface (e.g., via RAN 2120 using interfaces 2164-1 and 2164-2).

Additionally, or alternatively, satellite 2160 may include a GEO satellite, LEO satellite, or another type of satellite. Satellite 2160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 2160 may operate as bases stations (e.g., RAN nodes 2122) with respect to UEs 2110. As such, references herein to a base station, RAN node 2122, etc., may involve implementations where the base station, RAN node 2122, etc., is a terrestrial network node and implementation, where the base station, RAN node 2122, etc., is a non-terrestrial network node (e.g., satellite 2160).

Figure 22:
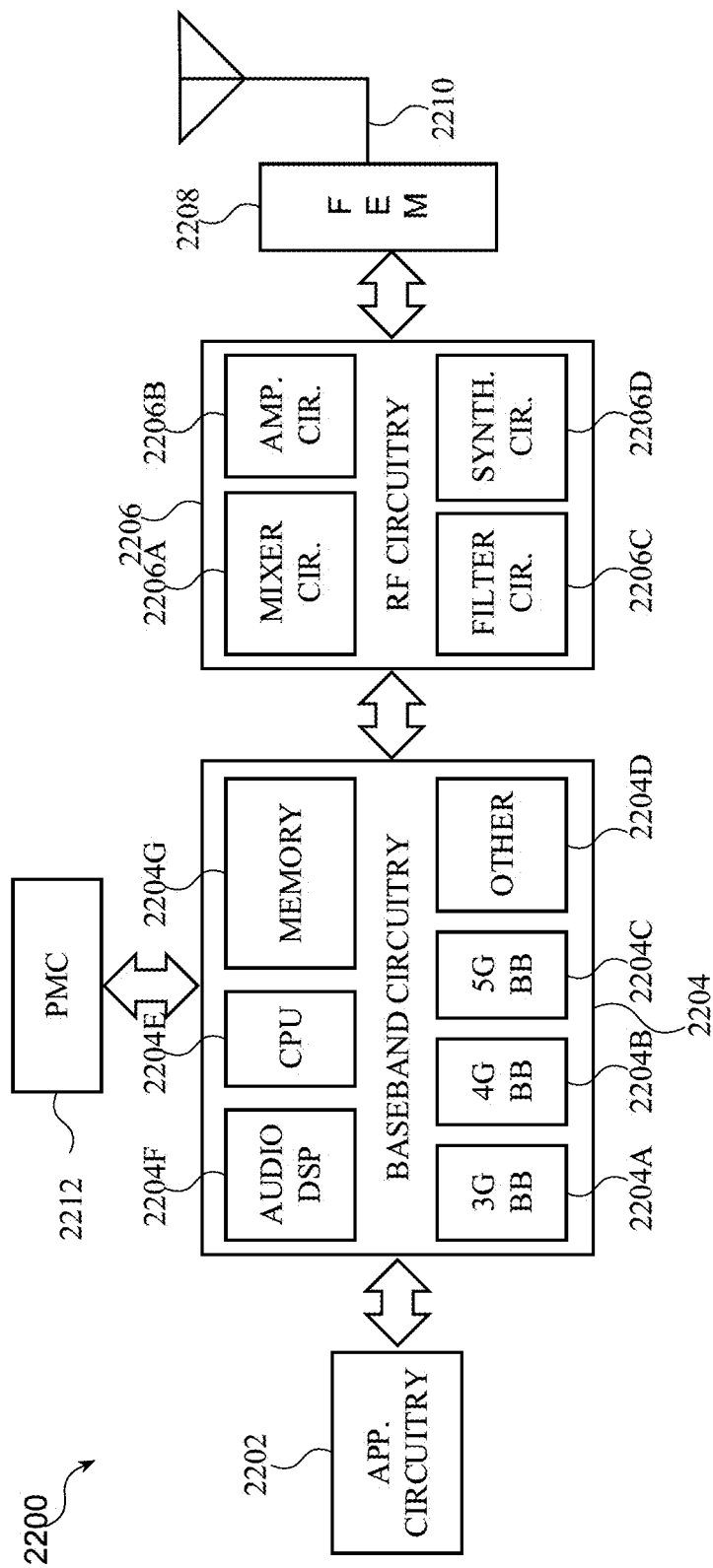
FIG. 22 is a diagram of example interfaces of baseband circuitry according to one or more implementations described herein.

FIG. 22 is a diagram of an example of components of a device according to one or more implementations described herein. In some implementations, the device 2200 can include application circuitry 2202, baseband circuitry 2204, RF circuitry 2206, front-end module (FEM) circuitry 2208, one or more antennas 2210, and power management circuitry (PMC) 2212 coupled together at least as shown. The components of the illustrated device 2200 can be included in a UE or a RAN node. In some implementations, the device 2200 can include fewer elements (e.g., a RAN node may not utilize application circuitry 2202, and instead include a processor/controller to process IP data received from a CN such as 5GC or an Evolved Packet Core (EPC)). In some implementations, the device 2200 can include additional elements such as, for example, memory/storage, display, camera, sensor (including one or more temperature sensors, such as a single temperature sensor, a plurality of temperature sensors at different locations in device 2200, etc.), or input/output (I/O) interface. In other implementations, the components described below can be included in more than one device (e.g., said circuitries can be separately included in more than one device for Cloud-RAN (C-RAN) implementations).

The application circuitry 2202 can include one or more application processors. For example, the application circuitry 2202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 2200. In some implementations, processors of application circuitry 2202 can process IP data packets received from an EPC.

The baseband circuitry 2204 can include circuitry such as, but not limited to, one or more single-core or multi-core processors. The baseband circuitry 2204 can include one or more baseband processors or control logic to process baseband signals received from a receive signal path of the RF circuitry 2206 and to generate baseband signals for a transmit signal path of the RF circuitry 2206. Baseband circuitry 2204 can interface with the application circuitry 2202 for generation and processing of the baseband signals and for controlling operations of the RF circuitry 2206. For example, in some implementations, the baseband circuitry 2204 can include a 3G baseband processor 2204A, a 4G baseband processor 2204B, a 5G baseband processor 2204C, or other baseband processor(s) 2204D for other existing generations, generations in development or to be developed in the future (e.g., 2G, 6G, etc.). The baseband circuitry 2204 (e.g., one or more of baseband processors 2204A-D) can handle various radio control functions that enable communication with one or more radio networks via the RF circuitry 2206. In other implementations, some or all of the functionality of baseband processors 2204A-D can be included in modules stored in the memory 2204G and executed via a Central Processing Unit (CPU) 2204E. The radio control functions can include, but are not limited to, signal modulation/demodulation, encoding/decoding, radio frequency shifting, etc. In some implementations, modulation/demodulation circuitry of the baseband circuitry 2204 can include Fast-Fourier Transform (FFT), precoding, or constellation mapping/de-mapping functionality. In some implementations, encoding/decoding circuitry of the baseband circuitry 2204 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 2204 can include one or more audio digital signal processor(s) (DSP) 2204F. The audio DSPs 2204F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 2204 and the application circuitry 2202 can be implemented together such as, for example, on a system on a chip (SOC).

In some implementations, the baseband circuitry 2204 can provide for communication compatible with one or more radio technologies. For example, in some implementations, the baseband circuitry 2204 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 2204 is configured to support radio communications of more than one wireless protocol can be referred to as multi-mode baseband circuitry.

RF circuitry 2206 can enable communication with wireless networks using modulated electromagnetic radiation through a non-solid medium. In various implementations, the RF circuitry 2206 can include switches, filters, amplifiers, etc. to facilitate the communication with the wireless network. RF circuitry 2206 can include a receive signal path which can include circuitry to down-convert RF signals received from the FEM circuitry 2208 and provide baseband signals to the baseband circuitry 2204. RF circuitry 2206 can also include a transmit signal path which can include circuitry to up-convert baseband signals provided by the baseband circuitry 2204 and provide RF output signals to the FEM circuitry 2208 for transmission.

In some implementations, the receive signal path of the RF circuitry 2206 can include mixer circuitry 2206A, amplifier circuitry 2206B and filter circuitry 2206C. In some implementations, the transmit signal path of the RF circuitry 2206 can include filter circuitry 2206C and mixer circuitry 2206A. RF circuitry 2206 can also include synthesizer circuitry 2206D for synthesizing a frequency for use by the mixer circuitry 2206A of the receive signal path and the transmit signal path. In some implementations, the mixer circuitry 2206A of the receive signal path can be configured to down-convert RF signals received from the FEM circuitry 2208 based on the synthesized frequency provided by synthesizer circuitry 2206D. The amplifier circuitry 2206B can be configured to amplify the down-converted signals and the filter circuitry 2206C can be a low-pass filter (LPF) or band-pass filter (BPF) configured to remove unwanted signals from the down-converted signals to generate output baseband signals. Output baseband signals can be provided to the baseband circuitry 2204 for further processing. In some implementations, the output baseband signals can be zero-frequency baseband signals, although this is not a requirement. In some implementations, mixer circuitry 2206A of the receive signal path can comprise passive mixers, although the scope of the implementations is not limited in this respect.

In some implementations, the mixer circuitry 2206A of the transmit signal path can be configured to up-convert input baseband signals based on the synthesized frequency provided by the synthesizer circuitry 2206D to generate RF output signals for the FEM circuitry 2208. The baseband signals can be provided by the baseband circuitry 2204 and can be filtered by filter circuitry 2206C.

In some implementations, the mixer circuitry 2206A of the receive signal path and the mixer circuitry 2206A of the transmit signal path can include two or more mixers and can be arranged for quadrature down conversion and up conversion, respectively. In some implementations, the mixer circuitry 2206A of the receive signal path and the mixer circuitry 2206A of the transmit signal path can include two or more mixers and can be arranged for image rejection (e.g., Hartley image rejection). In some implementations, the mixer circuitry 2206A of the receive signal path and the mixer circuitry' 2206A can be arranged for direct down conversion and direct up conversion, respectively. In some implementations, the mixer circuitry 2206A of the receive signal path and the mixer circuitry 2206A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 2206 can include analog-to-digital converter (ADC) and digital-to-analog converter (DAC) circuitry and the baseband circuitry 2204 can include a digital baseband interface to communicate with the RF circuitry 2206.

In some dual-mode implementations, a separate radio IC circuitry can be provided for processing signals for each spectrum, although the scope of the implementations is not limited in this respect.

In some implementations, the synthesizer circuitry 2206D can be a fractional-N synthesizer or a fractional N/N+1 synthesizer, although the scope of the implementations is not limited in this respect as other types of frequency synthesizers can be suitable. For example, synthesizer circuitry 2206D can be a delta-sigma synthesizer, a frequency multiplier, or a synthesizer comprising a phase-locked loop with a frequency divider.

The synthesizer circuitry 2206D can be configured to synthesize an output frequency for use by the mixer circuitry 2206A of the RF circuitry 2206 based on a frequency input and a divider control input. In some implementations, the synthesizer circuitry 2206D can be a fractional N/N+1 synthesizer.

In some implementations, frequency input can be provided by a voltage controlled oscillator (VCO), although that is not a requirement. Divider control input can be provided by either the baseband circuitry 2204 or the applications circuitry 2202 depending on the desired output frequency. In some implementations, a divider control input (e.g., N) can be determined from a look-up table based on a channel indicated by the applications circuitry 2202.

Synthesizer circuitry 2206D of the RF circuitry 2206 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 2206D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 2206 can include an IQ/polar converter.

FEM circuitry 2208 can include a receive signal path which can include circuitry configured to operate on RF signals received from one or more antennas 2210, amplify the received signals and provide the amplified versions of the received signals to the RF circuitry 2206 for further processing. FEM circuitry 2208 can also include a transmit signal path which can include circuitry configured to amplify signals for transmission provided by the RF circuitry 2206 for transmission by one or more of the one or more antennas 2210. In various implementations, the amplification through the transmit or receive signal paths can be done solely in the RF circuitry 2206, solely in the FEM circuitry 2208, or in both the RF circuitry 2206 and the FEM circuitry 2208.

In some implementations, the FEM circuitry 2208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 2206). The transmit signal path of the FEM circuitry 2208 can include a power amplifier (PA) to amplify input RF signals (e.g., provided by RF circuitry 2206), and one or more filters to generate RF signals for subsequent transmission (e.g., by one or more of the one or more antennas 2210).

In some implementations, the PMC 2212 can manage power provided to the baseband circuitry 2204. In particular, the PMC 2212 can control power-source selection, voltage scaling, battery charging, or DC-to-DC conversion. The PMC 2212 can often be included when the device 2200 is capable of being powered by a battery, for example, when the device is included in a UE. The PMC 2212 can increase the power conversion efficiency while providing desirable implementation size and heat dissipation characteristics.

While FIG. 22 shows the PMC 2212 coupled only with the baseband circuitry 2204. However, in other implementations, the PMC 2212 may be additionally or alternatively coupled with, and perform similar power management operations for, other components such as, but not limited to, application circuitry 2202, RF circuitry 2206, or FEM circuitry 2208.

In some implementations, the PMC 2212 can control, or otherwise be part of, various power saving mechanisms of the device 2200. For example, if the device 2200 is in an RRC_Connected state, where it is still connected to the RAN node as it expects to receive traffic shortly, then it can enter a state known as Discontinuous Reception Mode (DRX) after a period of inactivity. During this state, the device 2200 can power down for brief intervals of time and thus save power.

If there is no data traffic activity for an extended period of time, then the device 2200 can transition off to an RRC_Idle state, where it disconnects from the network and does not perform operations such as channel quality feedback, handover, etc. The device 2200 goes into a very low power state and it performs paging where again it periodically wakes up to listen to the network and then powers down again. The device 2200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 2202 and processors of the baseband circuitry 2204 can be used to execute elements of one or more instances of a protocol stack. For example, processors of the baseband circuitry 2204, alone or in combination, can be used execute Layer 3, Layer 2, or Layer 1 functionality, while processors of the baseband circuitry 2204 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

A first example can be an user equipment (UE), comprising: a radio frequency (RF) interface circuitry to receive channel state information (CSI) measurement resources of a downlink signal; one or more processors coupled to the RF circuitry, the one or more processors configured to cause the UE to: generate measurements of CSI measurement resources based on a multiple-input, multiple-output (MIMO) codebook configuration; generate a CSI report based on measurements of the CSI measurement resources; in response to the CSI report exceeding allocated uplink resources of an uplink control information (UCI) transmission, generate a compressed CSI report by performing a UCI omission to omit parameters of the CSI report based on components comprising a subset of frequency domain (FD) components and a subset of time domain (TD) components of the MIMO codebook configuration; and transmit the compressed CSI report.

A second example can include the first example, wherein the one or more processors are further configured to: determine priority levels of the components for the UCI omission according to a plurality of non-zero linear combination (LC) coefficients associated with the subset of TD components and the subset of FD components, a spatial layer, and a spatial beam.

A third example can include the first or second example, wherein the one or more processors are further configured to: divide the parameters of the UCI transmission into at least three UCI subsets of a UCI Part 2 information; and perform the UCI omission on the parameters associated with a subset of parameters having a lower priority than at least one other subset from among at least three UCI subsets.

A fourth example can include any one or more of the first through third examples, wherein the one or more processors are further configured to: map FD indices of the FD components according to an FD sequential order based on a wrap-around and a cyclic time shift of one or more non-zero LC coefficients; map TD indices of the TD components according to a TD sequential order based on the wrap-around and a cyclic frequency shift of one or more non-zero LC coefficients; and exclude indices associated with a strongest coefficient for a UCI subset of parameters with a lower priority than at least one other UCI subset of parameters from among a plurality of UCI subsets of parameters.

A fifth example can include any one or more of the first through fourth examples, wherein the one or more processors are further configured to: identify a plurality of pages of different frequency offsets associated with a plurality of spatial layers, wherein a page of the plurality of pages comprises a permutation of FD components and the plurality of pages comprises permutations of TD components therebetween; and determine a frequency offset order/permutation for omitting the components from among the plurality of pages based on non-zero LCC coefficients for the compressed CSI report.

A sixth example can include any one or more of the first through fifth examples, wherein the one or more processors are further configured to: partition different UCI measurement parameters into three groups, wherein a highest priority group comprises measurement parameters of at least one of: spatial domain (SD) rotation factors, SD indicator, or one or more strongest coefficient indicators (SCIs), wherein a next highest priority group comprises a set of next-highest priority non-zero LCC coefficients and next highest priority bits of a bitmap associated with the highest priority non-zero LCC coefficients, and wherein a low priority group comprising lowest priority non-zero LC coefficients having a lower priority than the next highest priority group and lowest priority bits of a bitmap, wherein the next highest priority group and the low priority group exclude a strongest LC coefficient, respectively.

A seventh example can include any one or more of the first through sixth examples, wherein the one or more processors are further configured to: prioritize a first portion of parameters of the next highest priority group associated with the highest priority non-zero LCC coefficients according to a priority function based on a spatial layer of the plurality of spatial layers, a spatial beam, an FD component and a TD component, respectively; and prioritize a second portion of measurement parameters of the lowest priority group associated with a lowest priority non-zero LC based on a spatial layer of the plurality of spatial layers, a spatial beam, an FD component and a TD component, respectively.

An eighth example can include any one or more of the first through seventh examples, wherein the one or more processors are further configured to: selecting the first portion of parameters and the second portion of measurement parameters by: iteratively selecting priority values over a subset of pages for the spatial beam, wherein the subset of pages corresponding to different frequency offsets associated with the spatial layer; iteratively selecting priority values of the FD component at each page of the subset of pages; and iteratively selecting priority values of the TD component at each page of the subset of pages; and omitting one or more TD components with a lowest priority associated with a strongest non-zero LC coefficient from the compressed CSI report.

A ninth example can include any one or more of the first through eighth examples, wherein the compressed CSI report comprises one or more locations of clusters of parameters among a plurality of subsets of pages, wherein each subset of pages of the plurality of pages is associated with a different spatial layer, and each page of the subset of pages comprises the FD components, the TD components and spatial beams of at least one non-zero LC coefficient.

A tenth example can include any one or more of the first through ninth examples, wherein the one or more processors are further configured to: select measurements to be omitted from the compressed CSI report based on a TD priority of the TD components, an FD priority of the FD components, a spatial beam priority of spatial beams, and a spatial layer priority of spatial layers, by iteratively sequencing through the TD components, the FD components, the spatial beams and the spatial layers in an order of any combination from first to last of: the TD components, the FD components, the spatial beams and the spatial layers.

An eleventh example can be a method of configuring a channel state information (CSI) report by a user equipment (UE), comprising: determining measurements of CSI measurement resources based on a multiple-input, multiple-output (MIMO) codebook configuration; in response to a CSI report exceeding allocated uplink resources of a UCI transmission, generating a compressed CSI report by performing an uplink control information (UCI) omission to omit parameters of the CSI report based on components comprising frequency domain (FD) components and time domain (TD) components; and performing the UCI transmission with the compressed CSI report.

A twelfth example can include the eleventh example, further comprising: determining a priority level of parameters of linear combination (LC) coefficients $c_{l,m,d}^{(\lambda)}$ for a UCI part 2 of the CSI report including the FD components and the TD components according to a priority level definition comprising: $\text{Prio}(\lambda,l,m,d) = N_3 \cdot 2L \cdot RI \cdot P_d(d) + 2L \cdot RI \cdot P(m) + RI \cdot I + \lambda$ where P(m) maps an index m according to a following order of the FD components: 0, $N_3-1$, 1, $N_3-2$, 2, ..., and $P_d(d)$ maps the index d according to a following order of the TD components: 0, $N_4-1$, 1, $N_4-2$, 2, ..., where spatial layer $\lambda \in \{0, 1, ..., $ rank indicator (RI)$-1\}$, spatial beam $l \in \{0, 1, ..., 2L-1\}$, FD-component basis $m \in \{0, 1, ..., M-1\}$, and TD-component basis $d \in \{0, 1, ..., M_d-1\}$.

A thirteenth example can include any one or more of the eleventh through twelfth examples, further comprising: iteratively reading out neighbor components to a strongest FD component and a strongest TD component in a wrap-around procedure; and selecting the neighbor components to include in the CSI report by normalizing the strongest FD component and a strongest TD component at an origin and performing a cyclic shift.

A fourteenth example can include any one or more of the eleventh through twelfth examples, further comprising: determining clusters of neighborhood components to strongest components from the FD components and the TD components among a plurality of pages associated with different frequency offsets for a spatial layer; reading out the clusters of neighborhood components in a wrap-around procedure and a cyclic shift of the strongest components; and selecting the clusters to report in the CSI report based on one or more indices of a second strongest component and neighbor components of a first strongest component.

A fifteenth example can include any one or more of the eleventh through the fourteenth examples, further comprising: selecting parameters to omit from a portion of UCI part 2 information comprising a lowest priority from among a plurality of portions of UCI part 2 information based on a priority function applied to each FD component and TD component.

A sixteenth example can include any one or more of the eleventh through the fifteenth examples, further comprising: reading out parameters of the FD components and the TD components from among a plurality of sheets based on a sequence order by iteratively identifying the FD components, the TD components, spatial beam(s), and spatial layer(s), wherein the sequence order for an iteration comprises FD components first, TD components second, a spatial beam third and a spatial layer fourth, or any order of iterating the FD components, the TD components, spatial beam(s), and spatial layer(s) in a sequence.

A seventeenth example can include any one or more of the eleventh through the sixteenth examples, further comprising: mapping TD components in a wrap-around procedure from a strongest TD component that is cyclically shifted to a zero origin; and mapping FD components in the wrap-around procedure from a strongest FD component that is cyclically shifted to the zero origin; identifying from among the TD components and the FD components in at least one cluster within a different coefficient neighborhood than a coefficient neighborhood of the strongest TD component and the strongest FD component; reading out pairs of indices of the TD components and the FD components within the coefficient neighborhood and the different coefficient neighborhood in an alternating sequence to one another; and reporting the at least one cluster based on one or more indices within the coefficient neighborhood and the different coefficient neighborhood.

An eighteenth example can be a method for processing a CSI report, comprising: providing, by a base station, CSI measurement resources for CSI measurement; providing, by the base station, a multiple-input, multiple-output (MIMO) codebook to a UE, wherein the MIMO codebook comprises with parameters select frequency domain (FD) components and time domain (TD) components; and receiving, by the base station, the CSI report comprising a compressed CSI report in an uplink control information (UCI) transmission.

A nineteenth example can include the eighteenth example, further comprising: generating, by the base station, one or more precoders based on the CSI report, wherein the CSI report comprises an indication of coefficients around different clusters in different neighborhoods from among a plurality of pages associated with a spatial layer, omitting a strongest component and components with a lower priority based on a priority function.

A twentieth example includes any one or more of the eighteenth through nineteenth examples, further comprising: generating a precoder for symbols associated with a first coefficient cluster of a first neighborhood and a second coefficient cluster in a second neighborhood based on the CSI report.

A twenty-first example includes any one or more of the eighteenth through twentieth examples, further comprising: receiving UCI part 2 with parameters associated with a portion of the UCI part 2 based on a priority function.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising:
   radio frequency (RF) circuitry; and
   one or more processors coupled to the RF circuitry and configured to execute instructions stored in a memory to cause the UE to:
   receive channel state information (CSI) measurement resources;
   generate measurements of the CSI measurement resources based on a multiple input multiple output (MIMO) codebook configuration;
   generate parameters for a CSI report based on the measurements of the CSI measurement resources;
   select parameters for a reduced CSI report to omit from a portion of uplink control information (UCI) part 2 based on a priority of the parameters for the CSI report, wherein a subset of the parameters for the CSI report corresponding to time domain parameters have a lower priority than three other subsets of parameters for the CSI report; and
   transmit the reduced CSI report via the RF circuitry.

2. The UE of claim 1, wherein the three other subsets of parameters for the CSI report correspond to frequency domain parameters, spatial layer components, and spatial beam components.

3. The UE of claim 1, wherein the subset of parameters corresponding to the time domain parameters are associated with one or more predicted precoders.

4. The UE of claim 1, wherein the priority of the parameters for the CSI report is based on a priority value definition, wherein a lowest priority value according to the priority value definition is a highest priority to be read out onto the reduced CSI report.

5. The UE of claim 4, wherein the priority value definition for a priority value parameter $c_{l,m,d}^{(\lambda)}$ comprises:
   $Prio(\lambda,l,m,d)=N_3 \cdot 2L \cdot RI \cdot P_d(d)+2L \cdot RI \cdot P(m)+RI \cdot l+\lambda$ where $P(m)$ maps an index m to frequency domain (FD) components, and $P_d(d)$ maps an index d to time domain (TD) components, where spatial layer $\lambda \in \{0,1, \ldots, $ rank indicator (RI)$-1\}$, spatial beam $l \in \{0,1, \ldots, 2L-1\}$, FD-component basis $m \in \{0,1, \ldots, M-1\}$, and TD-component basis $d \in \{0,1, \ldots, M_d-1\}$.

6. The UE of claim 5, wherein the priority value definition is further based on a value $N_4$ representing a maximum number of time units between the reduced CSI report and a predicted precoder for a physical downlink shared channel (PDSCH) in a latest valid time unit.

7. The UE of claim 5, wherein the priority value definition is further based on a value $N_4$ representing a number of time domain dimensions.

8. The UE of claim 5, wherein $N_3$ represents a number of frequency domain dimensions.

9. A method, comprising:
   determining measurements of channel state information (CSI) measurement resources based on a multiple input multiple output (MIMO) codebook configuration;
   generating parameters for a CSI report based on the measurements of the CSI measurement resources;
   selecting parameters for a reduced CSI report to omit from a portion of uplink control information (UCI) part 2 based on a priority of the parameters for the CSI report, wherein a subset of the parameters for the CSI report corresponding to time domain parameters have a lower priority than three other subsets of parameters for the CSI report; and
   transmitting the reduced CSI report.

10. The method of claim 9, wherein the three other subsets of parameters for the CSI report correspond to frequency domain parameters, spatial layer components, and spatial beam components.

11. The method of claim 9, wherein the subset of parameters corresponding to the time domain parameters are associated with one or more predicted precoders.

12. The method of claim 9, wherein the priority of the parameters for the CSI report is based on a priority value definition, wherein a lowest priority value according to the priority value definition is a highest priority to be read out onto the reduced CSI report.

13. The method of claim 12, wherein the priority value definition for a priority value parameter $c_{l,m,d}^{(\lambda)}$ comprises:
    $Prio(\lambda,l,m,d)=N_3 \cdot 2L \cdot RI \cdot P_d(d)+2L \cdot RI \cdot P(m)+RI \cdot l+\lambda$
    where $P(m)$ maps an index m to frequency domain (FD) components, and $P_d(d)$ maps an index d to time domain (TD) components, where spatial layer $\lambda \in \{0,1, \ldots, $ rank indicator (RI)$-1\}$, spatial beam $l \in \{0,1, \ldots, 2L-1\}$, FD-component basis $m \in \{0,1, \ldots, M-1\}$, and TD-component basis $d \in \{0,1, \ldots, M_d-1\}$.

14. A baseband processor configured to, when executing instructions stored in a memory, perform operations comprising:
    determining measurements of channel state information (CSI) measurement resources based on a multiple input multiple output (MIMO) codebook configuration;
    generating parameters for a CSI report based on the measurements of the CSI measurement resources;
    selecting parameters for a reduced CSI report to omit from a portion of uplink control information (UCI) part 2 based on a priority of the parameters for the CSI report, wherein a subset of the parameters for the CSI report corresponding to time domain parameters have a lower priority than three other subsets of parameters for the CSI report; and
    providing the reduced CSI report to a radio frequency (RF) interface for transmission.

15. The baseband processor of claim 14, wherein the three other subsets of parameters for the CSI report correspond to frequency domain parameters, spatial layer components, and spatial beam components.

16. The baseband processor of claim 14, wherein the subset of parameters corresponding to the time domain parameters are associated with one or more predicted precoders.

17. The baseband processor of claim 14, wherein the priority of the parameters for the CSI report is based on a priority value definition, wherein a lowest priority value according to the priority value definition is a highest priority to be read out onto the reduced CSI report.

18. The baseband processor of claim 17, wherein the priority value definition for a priority value parameter $c_{l,m,d}^{(\lambda)}$ comprises:

$\text{Prio}(\lambda,l,m,d) = N_3 \cdot 2L \cdot RI \cdot P_d(d) + 2L \cdot RI \cdot P(m) + RI \cdot l + \lambda$ where P(m) maps an index m to frequency domain (FD) components, and $P_d(d)$ maps an index d to time domain (TD) components, where spatial layer $\lambda \in \{0,1,\ldots,\text{rank indicator (RI)}-1\}$, spatial beam $l \in \{0,1,\ldots,2L-1\}$, FD-component basis $m \in \{0,1,\ldots,M-1\}$, and TD-component basis $d \in \{0,1,\ldots,M_d-1\}$.

19. The baseband processor of claim 18, wherein the priority value definition is further based on a value $N_4$ representing a maximum number of time units between the reduced CSI report and a predicted precoder for a physical downlink shared channel (PDSCH) in a latest valid time unit.

20. The baseband processor of claim 18, wherein the priority value definition is further based on a value $N_4$ representing a number of time domain dimensions.

21. The baseband processor of claim 18, wherein $N_3$ represents a number of frequency domain dimensions.

* * * * *